US011923665B2

(12) United States Patent
McKimmey et al.

(10) Patent No.: US 11,923,665 B2
(45) Date of Patent: Mar. 5, 2024

(54) PREFABRICATED ELECTRICAL MODULES AND SYSTEM WITH FABRICATION AND CONSTRUCTION METHODS

(71) Applicants: Rodney Lee McKimmey, Reno, NV (US); Nicholas Bartholomew, Reno, NV (US)

(72) Inventors: Rodney Lee McKimmey, Reno, NV (US); Nicholas Bartholomew, Reno, NV (US)

(*) Notice: Subject to any disclaimer, the term of this patent is extended or adjusted under 35 U.S.C. 154(b) by 393 days.

(21) Appl. No.: 17/499,647

(22) Filed: Oct. 12, 2021

(65) Prior Publication Data

US 2022/0037861 A1 Feb. 3, 2022

Related U.S. Application Data

(63) Continuation-in-part of application No. 29/727,373, filed on Mar. 10, 2020, now Pat. No. Des. 999,175,
(Continued)

(51) Int. Cl.
*H02B 1/04* (2006.01)
*H01H 71/02* (2006.01)
(Continued)

(52) U.S. Cl.
CPC ......... *H02B 1/042* (2013.01); *H01H 71/0271* (2013.01); *H02G 3/083* (2013.01); *H02G 3/088* (2013.01); *H02G 3/105* (2013.01)

(58) Field of Classification Search
CPC .. H02B 1/015; H02B 1/04; H02B 1/28; H02B 1/202; H02B 1/042; H02G 3/0431;
(Continued)

(56) References Cited

U.S. PATENT DOCUMENTS

D284,959 S 8/1986 Berg
5,073,841 A * 12/1991 DelGuidice ............ H02B 1/202
361/825
(Continued)

OTHER PUBLICATIONS

Notice of Allowance for U.S. Appl. No. 29/727,329 dated: Mar. 20, 2023.
(Continued)

*Primary Examiner* — Hoa C Nguyen
*Assistant Examiner* — Amol H Patel
(74) *Attorney, Agent, or Firm* — Connie R. Masters

(57) ABSTRACT

Prefabricated electrical modules and system along with fabrication and construction methods are provided. The prefabricated electrical system includes multiple framed, prefabricated electrical modules of one or more types. The prefabricated electrical module disclosed may comprise one or more of a main service electrical module, a low-voltage module, a switch component module, and a receptacle component module. The casing of the interior components of the modules is weatherproofed and/or weatherized. Each of the modules includes a module exterior frame that accommodates the specialized elements of that particular module. Methods for fabrication of the modules are disclosed. Construction methods for installing the assemblies are also disclosed.

20 Claims, 28 Drawing Sheets

Related U.S. Application Data and a continuation-in-part of application No. 29/727,329, filed on Mar. 10, 2020, now Pat. No. Des. 1,002,555, and a continuation-in-part of application No. 29/727,367, filed on Mar. 10, 2020, and a continuation-in-part of application No. 29/727,382, filed on Mar. 10, 2020, now Pat. No. Des. 987,586.

(60) Provisional application No. 63/090,699, filed on Oct. 12, 2020.

(51) Int. Cl.
| | | |
|---|---|---|
| *H02B 1/20* | (2006.01) | |
| *H02B 1/28* | (2006.01) | |
| *H02G 3/00* | (2006.01) | |
| *H02G 3/04* | (2006.01) | |
| *H02G 3/08* | (2006.01) | |
| *H02G 3/10* | (2006.01) | |

(58) Field of Classification Search
CPC ......... H02G 3/00; H02G 3/105; H02G 3/088; H02G 3/083; H01H 71/0271; H05K 5/0247
See application file for complete search history.

(56) References Cited

U.S. PATENT DOCUMENTS

| | | | |
|---|---|---|---|
| 5,378,058 A * | 1/1995 | Tessmer | H02B 1/50 312/298 |
| D408,015 S | 4/1999 | Faucher | |
| D425,493 S | 5/2000 | Cutright et al. | |
| D427,454 S | 7/2000 | Munch et al. | |
| D432,098 S | 10/2000 | Nelson et al. | |
| D630,173 S | 1/2011 | Donowho et al. | |
| D702,198 S | 4/2014 | Gretz | |
| D743,358 S | 11/2015 | Cagliani et al. | |
| D789,899 S | 6/2017 | Lippe | |
| D801,335 S | 10/2017 | Klingebiel | |
| D864,004 S | 10/2019 | Krissel et al. | |
| 2008/0079341 A1* | 4/2008 | Anderson | G02B 6/4452 312/287 |
| 2008/0218947 A1* | 9/2008 | Atkinson | H04Q 1/03 361/622 |
| 2009/0091898 A1* | 4/2009 | Loeffelholz | H04Q 1/10 361/752 |
| 2011/0051341 A1* | 3/2011 | Baldassano | H05K 7/1485 439/502 |
| 2013/0194772 A1* | 8/2013 | Rojo | H05K 13/00 29/407.01 |
| 2021/0313786 A1* | 10/2021 | Yuventi | H02B 1/015 |

OTHER PUBLICATIONS

Notice of Allowance for U.S. Appl. No. 29/727,367 dated: Mar. 20, 2023.

Notice of Allowance for U.S. Appl. No. 29/727,373 dated: Mar. 20, 2023.

Notice of Allowance for U.S. Appl. No. 29/727,382 dated: Mar. 21, 2023.

Notice of Allowance for U.S. Appl. No. 29/882,558 dated: May 25, 2023.

* cited by examiner

PREFABRICATED ELECTRICAL MODULES AND SYSTEM WITH FABRICATION AND CONSTRUCTION METHODS

FIELD OF INVENTION

This invention relates generally to distribution of electric power, and, more particularly, to modules, frameworks, casings, and parts thereof for use in a construction system along with fabrication and construction techniques and methods thereof.

BACKGROUND OF THE INVENTION

Construction of new buildings takes considerable time and manpower, which leads to higher costs. Particularly multi-unit construction presents logistical challenges, due to the number of workmen needed and the logistics of getting materials and workmen at the right time and to the right place and in the right order, since some types of work must be completed before other types of work can be started.

Typically, basic materials are transported to the construction site and assembled by workmen. One major bottleneck is the installation of the electrical systems, particularly in multi-unit buildings. With traditional construction methods electricians cannot begin the electrical rough installation process until the building is "dried in," which means that the installation of all windows, doors, and roofing is complete to create a weatherproof building envelope. Inspectors require the building to be dried in prior to installation of electrical systems to ensure no moisture begins to deteriorate non-waterproofed materials. If there are several (or many) floors of residential or commercial units, a very significant amount of time is spent waiting before the electrical installation can even begin on the first floor. Thus, multi-unit construction is particularly expensive due to labor costs, time delays, inconsistencies in installation, and slow rough inspection processes.

Accordingly, there is a need for an electrical construction system and for methods that minimize labor costs in the field, reduce time delays, increase consistent high-quality installations, and reduce the time until the rough electrical installation is finished, and the rough electrical inspection can be accomplished, because the cost savings can be quite significant.

BRIEF SUMMARY OF THE INVENTION

The present invention is directed to one or more types of framed, prefabricated electrical modules that may be installed in bays of walls being constructed at a wall prefabrication factory or may be installed in bays of walls directly in the field during construction of a building. The present invention is also directed to a weatherproof prefab system utilizing the prefabricated electrical modules. The prefabricated electrical modules carry weatherized and/or weatherproof interior elements that facilitate early and easy electrical installation. The present invention further provides methods for fabrication of the weatherized, prefabricated electrical modules, methods of installation of the prefabricated electrical modules, and methods of installation of the weatherproof prefab system as a whole.

The interior elements (which may include a circuit breaker panel, low-voltage hub, receptacle, and/or switch) of the prefabricated electrical modules are weatherproofed, and the wiring provided is weatherproof (such as type UF cable or other outdoor-rated cable). The weatherproofing of the electrical modules allows early installation of the modules—and, thus, completion of the rough electrical installation on the lower floor(s) of a multi-floor building—without waiting for the building envelope to be dried in. Thus, the rough electrical inspection can be moved up in time, potentially saving months of time in multi-floor buildings, with the amount of time saved depending substantially on the number of units and/or floors in the building being constructed.

Additionally, the prefabrication of the electrical modules increases quality consistency and reduces material wastage compared to creation of the module at a wall fabrication facility or installation at the building site. Additionally, labor costs in the field are reduced, which reduces the overall cost, since on-site labor costs are higher than labor costs in the fabrication plant.

The prefabricated electrical modules herein provided may comprise one or more types. The types include a main service electrical assembly or module, a low-voltage assembly or module, a switch component assembly or module, and/or a receptacle component assembly or module. Each of the prefabricated electrical modules includes a module exterior frame that accommodates the weatherized, specialized elements of that particular module.

In an aspect of the invention, the wiring provided within the modules is a weatherproof type of wiring.

In an additional aspect of the invention the wiring provided within the modules is a UL listed outdoor wiring.

In one aspect of the invention, the frame of the modules is formed of 2×6 lumber.

In another aspect of the invention, the frame of the modules is formed of 2×4 lumber.

In an additional aspect of the invention, the module frame of the modules is formed of metal.

In another aspect of the invention, the module frame top wall of the modules is configured with access holes.

In a further aspect of the invention, the module frame bottom wall of the modules is configured with access holes.

In another aspect of the invention, the rear of the module frame is closed by a frame backing.

In a further aspect of the invention, the module frame lacks a frame backing and is open on both the front and the back.

In another aspect of the invention, lengths of wiring to be carried by the modules are cut to the specifications of the unit panel schedule.

In a further aspect of the invention, the module middle compartment top wall and module middle compartment bottom wall are formed by the top and bottom walls of an enclosure casing.

In an additional aspect of the invention, the module middle compartment top wall and module middle compartment bottom wall comprise separate wood or plastic panels.

In an additional aspect of the invention, the top of the enclosure casing of the circuit breaker panel is covered with a waterproof membrane.

In another aspect of the invention, the top and back of the enclosure casing of the circuit breaker panel are covered with a waterproof membrane.

In a further aspect of the invention, the top of the low-voltage enclosure casing is covered with a waterproof membrane.

In an additional aspect of the invention, the top and back of the low-voltage enclosure casing are covered with a waterproof membrane.

The object of the invention is to provide a system and method for electrical installation, particularly during initial building construction, which gives an improved performance over the prior art systems and methods.

These and other objects, features, and advantages of the present invention will become more readily apparent from the attached drawings and from the detailed description of the preferred embodiments which follow.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements.

Like reference numerals refer to like parts throughout the several views of the drawings.

DETAILED DESCRIPTION OF THE INVENTION

Shown throughout the figures, the present invention is directed toward at least one of the prefabricated electrical assembly modules 200, 300, 400 used in building construction, toward fabrication of at least one of the prefabricated electrical modules 200, 300, 400, toward a weatherproof prefab system utilizing at least one of the prefabricated electrical modules 200, 300, 400, toward construction methods for installation of at least one of the prefabricated electrical modules 200, 300, 400, and toward methods of installation of the weatherproof prefab system as a whole.

The usage of at least one of the prefabricated electrical modules 200, 300, 400, of the prefab system, and of the disclosed fabrication and construction techniques provide advantages both for on-site construction and for prefabricated construction at a manufacturing facility, such as a wall prefabrication factory. When the modular assemblies are installed at a factory into prefabricated walls, they increase consistency, uniformity, and reliability. When the modular panels are installed at the construction site, they additionally reduce construction time and on-site manpower required. Particularly in multi-unit buildings, the rough electrical inspection is moved quite significantly earlier, because the weatherized prefabricated modules 200, 300, 400 can be installed before dry in of the building.

The systems, procedures, and methods provided together create a system usable in all residential and commercial construction, but which is particularly suitable for use in the electrical installation of multi-family or other multi-unit construction.

Figure 33:
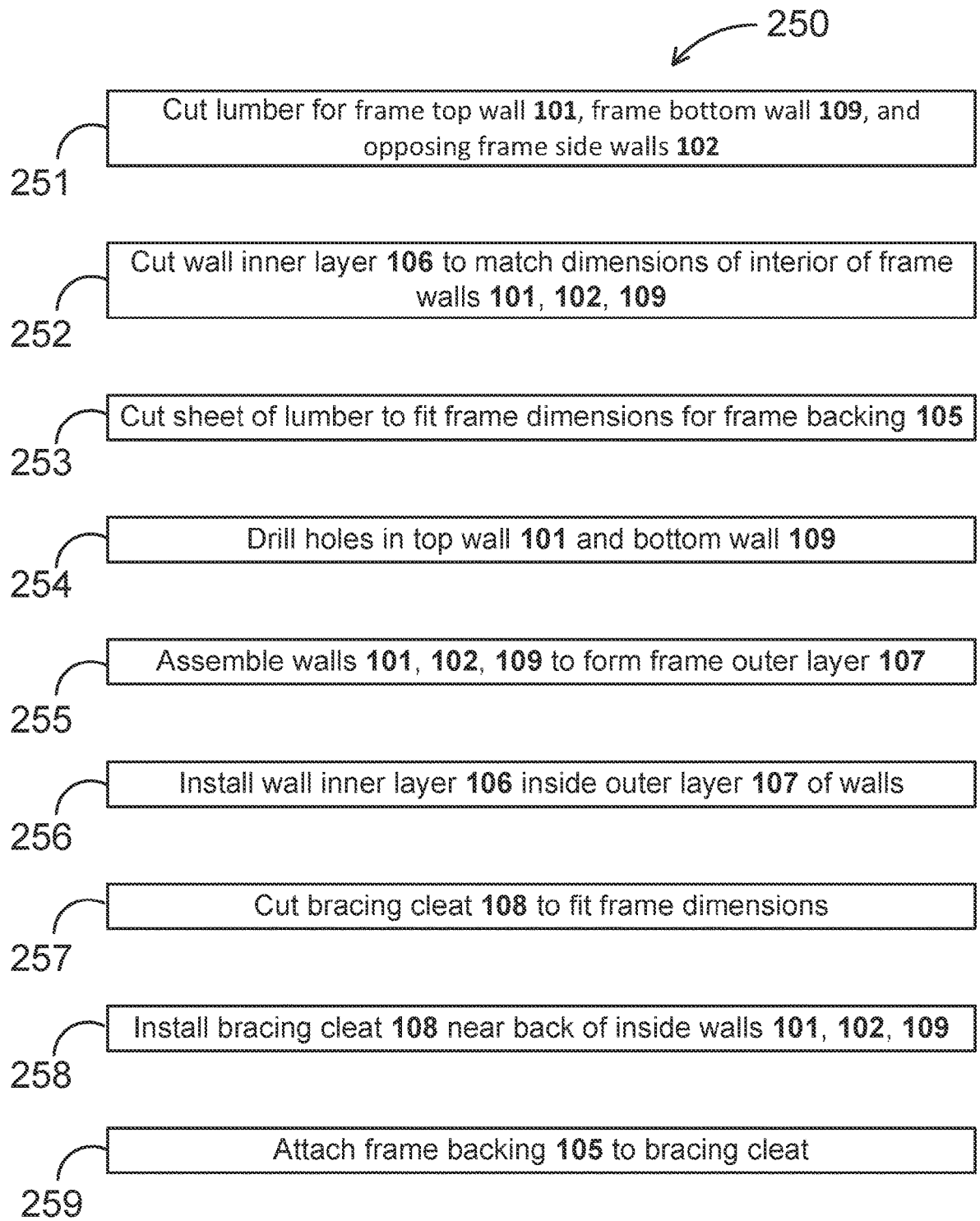
FIG. 33 is a flowchart of steps of frame fabrication of a prefabricated electrical module of the present invention.
Figure 34:
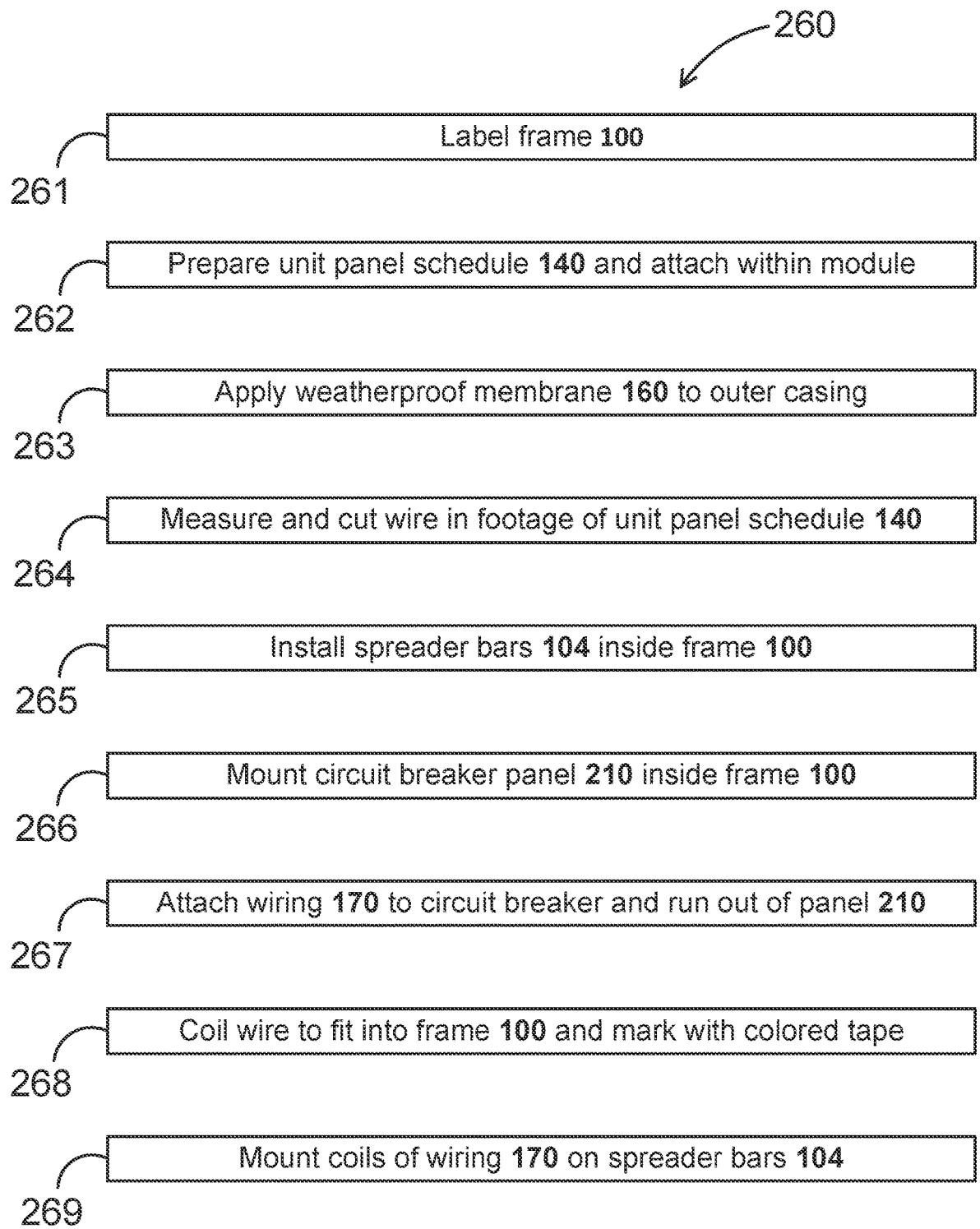
FIG. 34 is a flowchart of steps of in the electrical prefab mounting of the interior elements and components of a prefabricated electrical module of the present invention.

Fabrication methods of the prefabricated electrical modules 200, 300, 400 are disclosed in FIGS. 33-34. Various construction techniques that employ the modular electrical panels are also provided.

In overview, the weatherized prefabricated electrical module of the present invention includes at least one of a main service electrical modular assembly 200 (FIGS. 1-7), a low-voltage hub modular assembly 300 (FIGS. 8-13), and a component (switch or receptacle) modular assembly 400 (FIGS. 14-25). Each of the weatherized prefabricated electrical modules 200, 300, 400 is carried in a module exterior frame 100.

Figure 32:
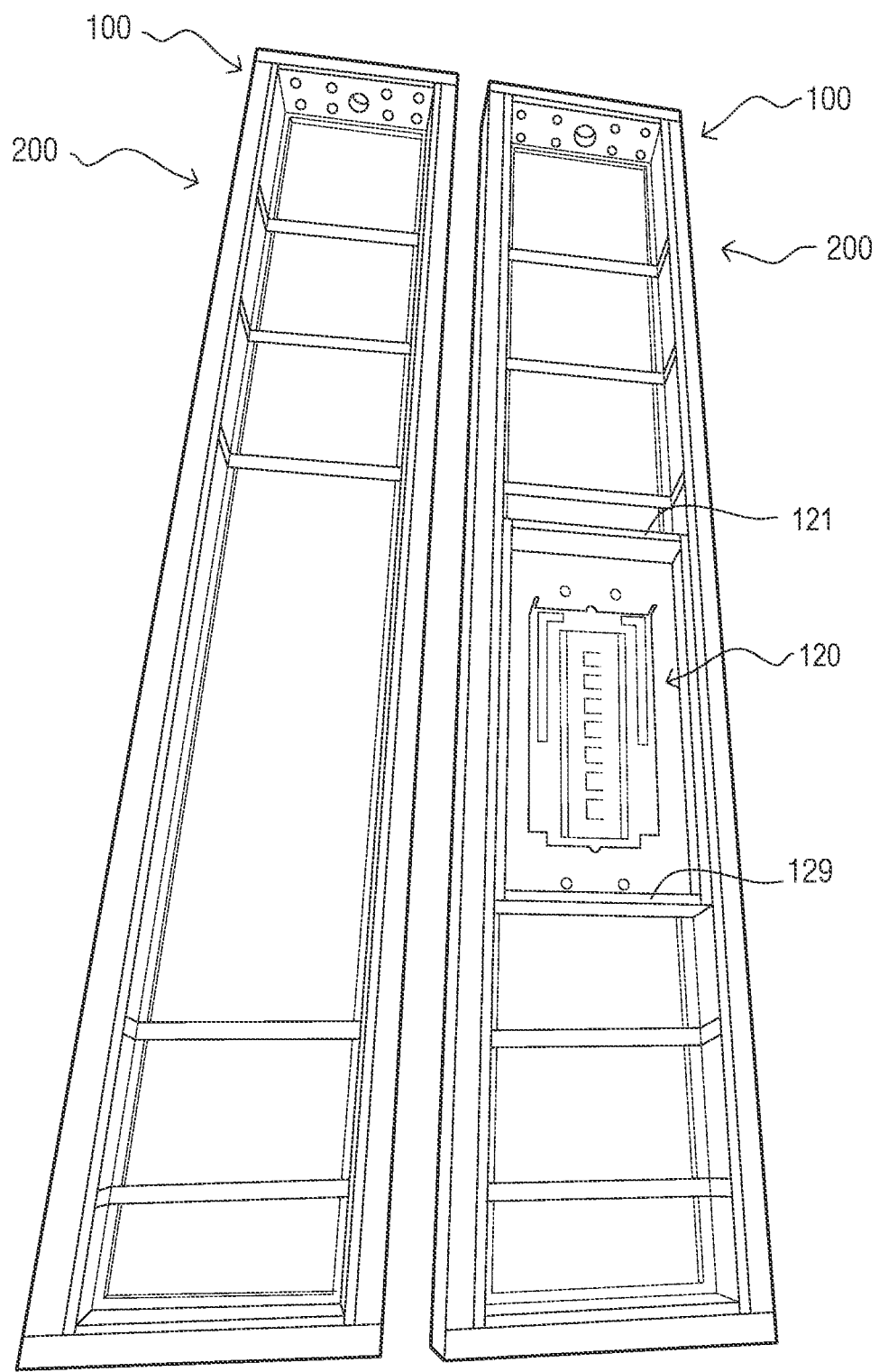
FIG. 32 is a perspective bottom view of two main service electrical modules of the present invention in which the left module is prepared to receive the circuit breaker panel and in which the circuit breaker panel is installed in the right module.

The main service electrical modular assembly 200 houses a circuit breaker panel 210 and wiring 170. The wiring 170 includes home run wiring. The home run wiring, when installed in the unit, extends from a breaker in the main service electrical modular assembly 200 to the first outlet in the unit into which it is installed. The circuit breaker panel 210 includes an enclosure casing 211 (FIGS. 1, 29) that provides at least a circuit breaker panel casing top wall 121 (FIG. 32), and typically also includes a casing back, casing side walls, and casing bottom 129 (FIG. 32).

The low-voltage hub 300 houses a low-voltage data/video/phone assembly 315 and low-voltage wiring 305. The wiring includes home run wiring. The home run wiring, when installed in the unit, extends from a connection in the low-voltage assembly 215 to the first low-voltage component in the unit. The low-voltage data/video/phone assembly 315 includes an enclosure casing 310.

Component modules 400 for use in a unit may be of the switch-type module 410 and/or the receptacle-type module 430. The switch-type module 410 accommodates a switch 415 and electrical wiring 170. The receptacle-type module 430 accommodates a receptacle 435 and electrical wiring 170.

Figure 26:
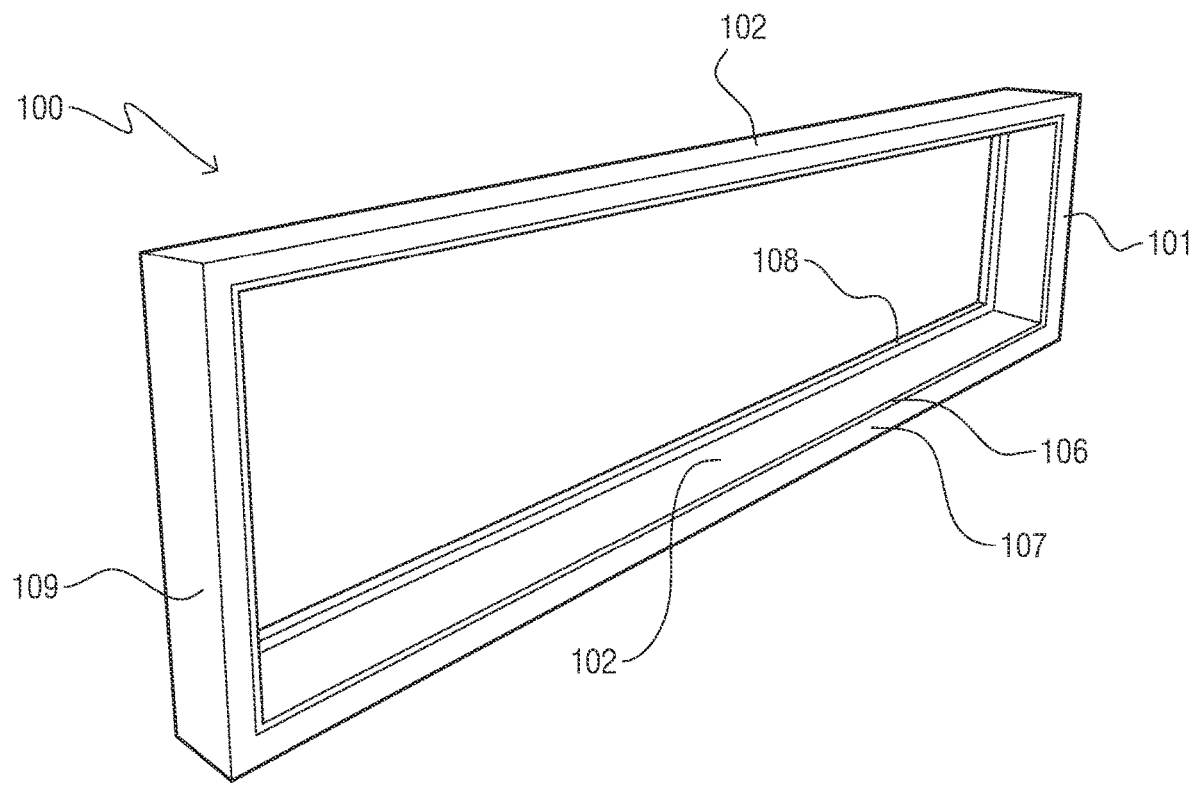
FIG. 26 is a perspective front view of a frame portion of a prefabricated electrical module of the present invention.
Figure 27:
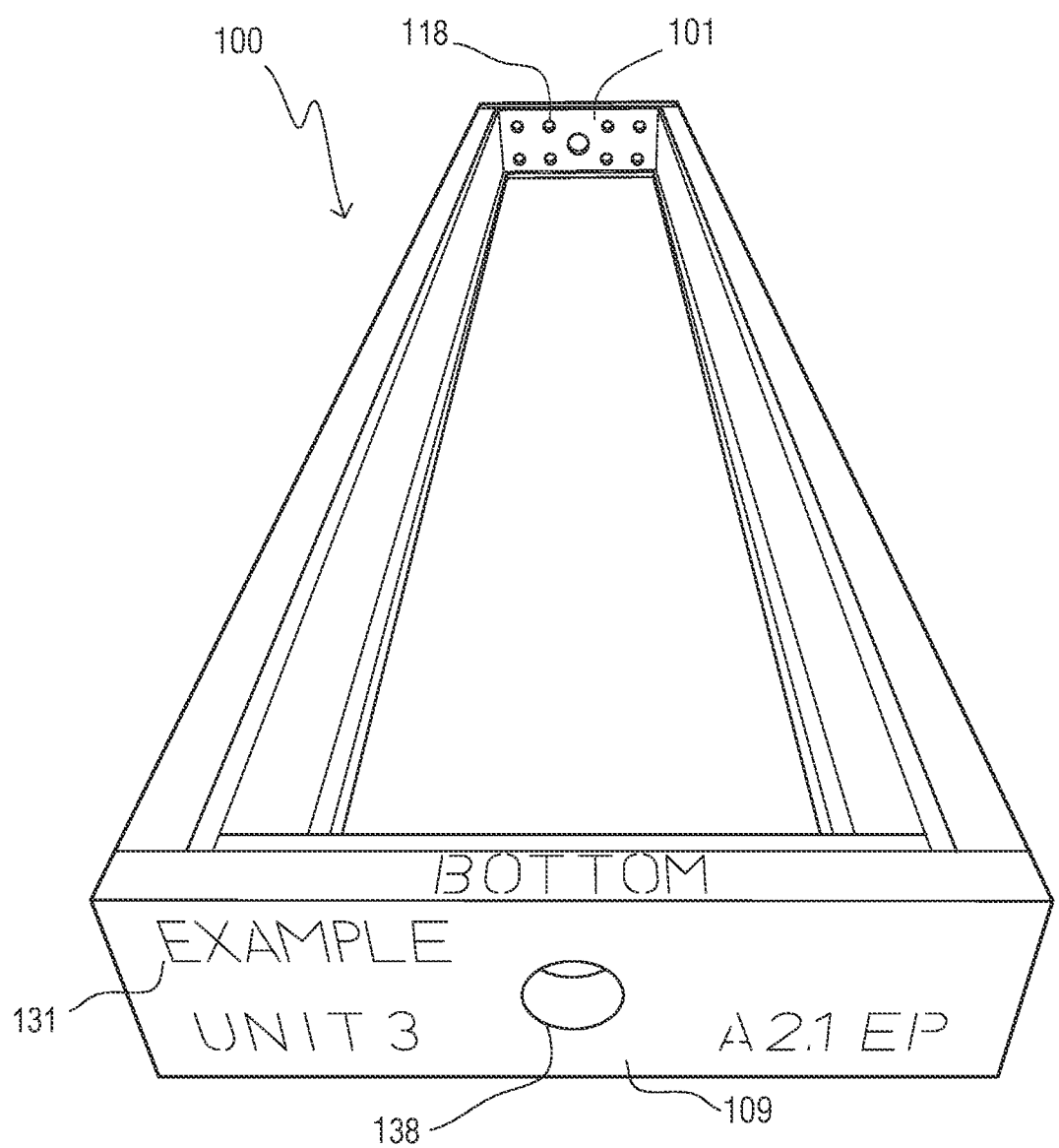
FIG. 27 is a perspective bottom view of a frame portion of a prefabricated electrical module of the present invention.
Figure 29:
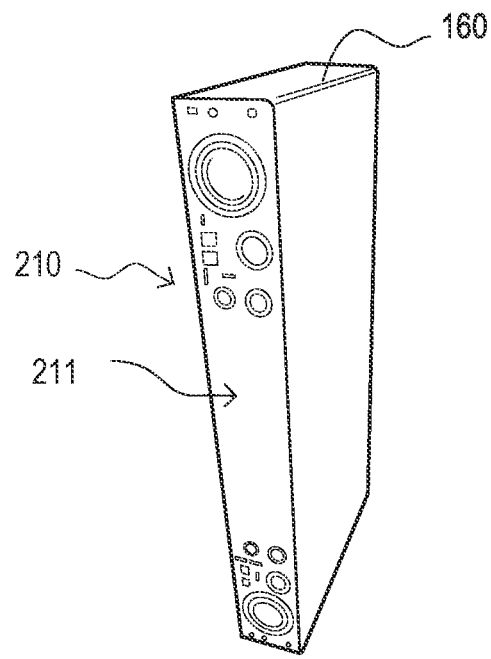
FIG. 29 is a perspective back view of an enclosure casing of a prefabricated electrical module of the present invention showing the weatherization of the enclosure casing.
Figure 30:
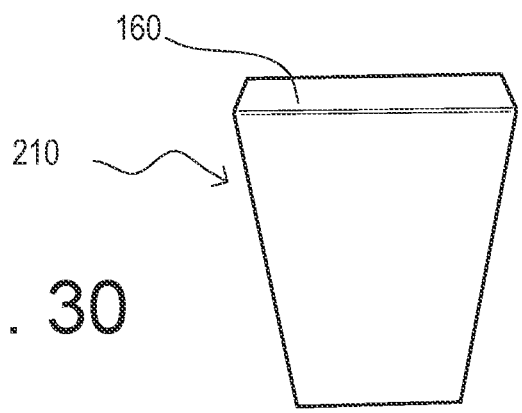
FIG. 30 is a back view of an enclosure casing of a prefabricated electrical module of the present invention showing the weatherization of the enclosure casing.
Figure 31:
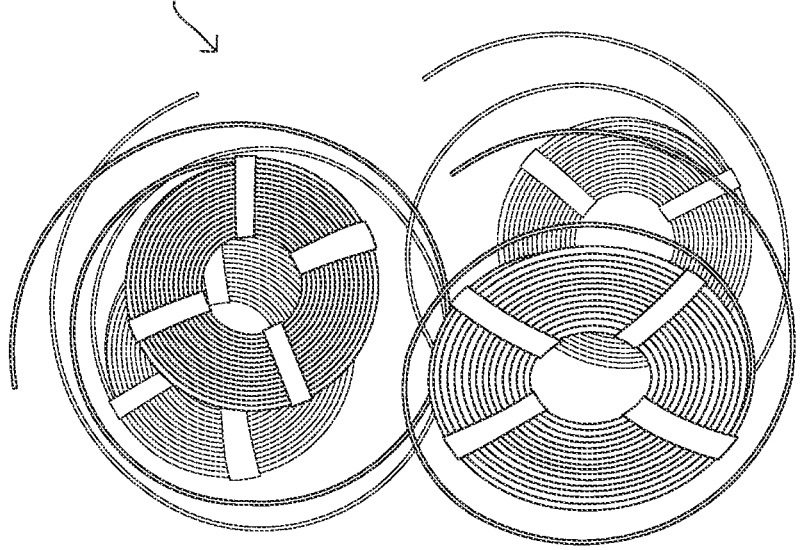
FIG. 31 is a perspective front view of coils of wiring that will be received in a prefabricated electrical module of the present invention.

The interior elements of the main service electrical modular assembly 200, low-voltage data/video/phone assembly 300, and component modular assembly 400 are each mounted within frames 100 (FIGS. 26-27). When the prefabricated electrical modules 200, 300, 400 are to be installed at a construction site, the interior elements are weatherized by the application of a weatherproof membrane 160, as seen in FIGS. 29-30 to an enclosure casing. Also, weatherproof wiring 170 (such as UL wiring or outdoor wiring) is provided in the prefabricated electrical modules 200, 300, 400. When the prefabricated electrical modules 200, 300, 400 are to be installed at a wall prefabrication factory, the weatherization of an enclosure casing of the interior elements and the provision of weatherproof wiring 170 may not be required. Weatherization of the particular module may include weatherization of the enclosure casing of the circuit board panel in the main service electrical module 200, the low-voltage enclosure casing 310 in the low-voltage hub module 300, and the enclosure casings of the switches 415 and/or receptacles 435 of the component module 400.

In overview, to begin the process of construction of multi-unit residential or commercial buildings, the electrical contractor (which may include both electrical and low-voltage contractors) supplies to the framer the desired locations for the main service electrical module 200, the low-voltage hub module 300, and/or the components (switches and receptacles) that are not located within the soffit. Coordination meetings begin to ensure that the locations provided are acceptable.

Once the locations have been verified and approval has been received, the electrical contractor prepares a written plan including roping diagrams and boxing diagrams specifying the locations of all devices within the units. The electrical contractor identifies pathways for each circuit and the length to their home-run locations. Based on this, the electrical contractor identifies all components (switches and receptacles) that will be used within the residential or commercial unit and creates an electrical unit layout or prefab plan that uses one or more of the weatherized prefabricated electrical modules 200, 300, 400. Further coordination meetings are carried out to verify the locations of all electrical prefabricated components provided and to assure that there are no conflicts. Once a final approval is received, the component manufacturing process is begun.

In the component manufacturing process, unit panel schedules 140 and unit layouts (based on the electrical unit layout) are prepared and distributed to the manufacturing supervisors. Since multiple units of the same design are typically included in a multi-unit building, generally the unit panel schedules 140 and unit layouts will be applicable to multiple units within a construction phase. A brief meeting is preferably held to discuss every component in each unit type in each phase.

Then production of the modules 200, 300, 400 can begin by following the plans laid out in the design coordination meetings, unit panel schedule, and unit layouts. The main electric service module 200 will be constructed with a circuit breaker panel 210 and will include a copy of the unit panel schedule 140. The low-voltage hub module 300 will be constructed to encase the low-voltage data/video/phone assembly 315 and will include a copy of the unit wiring layout.

The module exterior frames 100 for any of the three types of modules 200, 300, 400 to be used in the construction will then be created using the frame fabrication steps 250 as outline in FIG. 33. The frames 100 are labeled with data including the unit number and the type of module. In one aspect of the invention, the enclosure casings (casing 210 of the circuit breaker panel 210, low-voltage enclosure casing 310, and casings of the switch 415 and receptacles 435) will be made weather resistant by applying a waterproof membrane 160 to at least the top surface of each enclosure casing and/or to the top and back surfaces of each enclosure casing.

Weatherproof electrical wiring, such as UL wire or outdoor wiring, is used instead of the typical non-weatherproof Romex wire. It is cut to the lengths specified in the unit panel schedule. A proximal end of the weatherproof wire is connected to connectors within the enclosure casing, and the wiring remainder run out of the casing, coiled, and stored within the module for use at the job site. After inspection for completion and accuracy, all of the modules 200, 300, 400 for one particular unit are palletized, shipped, and delivered to the location where they are to be installed. This location may be a construction site or may be a wall prefabrication factory or the like that creates prefabricated wall systems.

For a field installation at a construction site, plans are distributed to the workers (who may be electricians, low-voltage installers, or other technicians) who will install all components. A meeting will be held to assure that each worker understands the types of modules 200, 300, and/or 400 that they will receive and understands the placement of each within the units. Each of the modules 200, 300, 400 is installed within a bay of a wall at the proper mounting height (as defined in building standards). Romex or UL cable may be unfurled and connected to devices located in adjacent bays. Any remaining electrical devices (such as a non-weatherized, non-modular switch or receptacle) are installed once the unit has been dried in.

For installation of the modules 200, 300, and/or 400 at a wall prefabrication factory, in one aspect of the invention, the enclosure casing does not have the weatherproof membrane installed and the wiring need not be type UL cable, but may be non-weatherized, such as sold under the trademark ROMEX. In another aspect of the invention, the enclosure casing is weatherized with weatherproof membrane and type UL cable is used for the wiring. In the wall prefabrication factory, plans are distributed to the workers who will installing the modules 200, 300, and/or 400 within the prefab walls. A meeting will be held to assure that each worker understands the types of modules 200, 300, and/or 400 that they will be installing and understands the placement of each within the wall units. Each of the modules 200, 300, 400 is installed within their specified bay at the proper mounting height. Then the wall unit is shipped to the jobsite with the modules 200, 300, and/or 400 installed within the wall unit. The wall units are hoisted into their proper location. Any remaining devices are installed once the building unit has been dried in. The non-weatherized cable or weatherized UL cable may be unfurled and connected to devices located in adjacent bays.

In more detail, the module exterior frame 100 is illustrated in FIGS. 1-7 as housing a main service module 200, is illustrated in FIGS. 8-13 as housing a low-voltage hub module 300, is illustrated in FIGS. 14-19 as housing a switch-type module 410 of the component modular assemblies 400, and is illustrated in FIGS. 20-25 as housing a receptacle-type module 430 of the component modular assemblies 400. The frame 100 of the main service module 200 is described in detail below in relation to FIG. 33 with the frames of the other modules 300, 400 being variations of the frame 100 of the main service module 200.

In the various types of prefabricated electrical modules 200, 300, and/or 400, the frame 100 is formed of a frame top wall 101, frame bottom wall 109, and opposing frame side walls 102. In some aspects of the invention, the frame 100 further includes a frame backing 105. Preferably the frame backing 105 is included in the frame 100 of the main service module 200 shown in FIGS. 1-7 and of the low-voltage hub module 300 shown in FIGS. 8-13. Preferably, to save material costs, the frame backing 105 is omitted from the component modules 400.

The walls 101, 102, 109 of the module exterior frame 100 are each formed by an outer layer 107, and in some aspects of the invention, the walls are formed of both an outer layer 107 and an inner layer 106. Preferably the main service module 200 and the low-voltage hub module 300 have frame walls formed of both the outer layer 107 and inner layer 106. Preferably the frame walls of the component modules 400 are formed of only the outer layer 107. In a preferred aspect, the outer layer 107 is formed of wood, such as 2×6 lumber (shown in FIG. 1 for the main electrical service module 200). In another aspect the outer layer 107 is formed by using 2×4 lumber (shown in FIGS. 8-13 for the low-voltage hub module 300 and shown in FIGS. 14-25 for the component module 400).

In one aspect of the invention regular lumber is used outer layer 107. In another aspect (for example, when the module is destined for installation in exterior walls of the unit), fire-treated lumber may be used. In further aspect of the invention the outer layer 107 is formed of metal instead of wood.

In the aspect in which the main electrical service module 200 or the low-voltage hub module 300 have frame walls 101, 102, 109 that comprise a wall outer layer 107 lined with a wall inner layer 106, the inner layer 106 is preferably formed of fiberglass mat gypsum sheathing, such as the fiberglass mat gypsum sheathing sold under the trademark DENSGLASS.

FIGS. 1-7 illustrate a main electrical service module 200 contained within the module exterior frame 100. The frame 100 is formed of a frame top wall 101, frame bottom wall 109, opposing frame side walls 102, and a frame backing 105. The module 200 also includes horizontally extending compartment-dividers (middle compartment top wall 121 and compartment bottom wall 129), which may be formed as part of the frame 100, may be formed by a horizontally extending top and/or bottom portion of the enclosure casing, as seen in the top of middle compartment 120 in FIG. 32, or may be formed by a combination of the frame and the top and/or bottom portion of the enclosure casing, as seen at the bottom of the middle compartment 120 in FIG. 32.

The main electrical service module 200 is divided into an upper compartment 110, a middle compartment 120, and a lower compartment 130 separated by horizontally extending compartment-dividers. In the aspect seen in FIG. 32, the middle compartment 120 is defined by the outer sides of the enclosure casing of the circuit breaker panel 120. In FIG. 32, the frame on the left is completed and ready to receive the circuit breaker panel 120. The enclosure casing carrying the circuit breaker panel 120 (including multiple circuit breakers 215) is installed in the frame 100 on the right to create the interior of the middle compartment 120.

The middle compartment 120 extends vertically between a middle compartment top wall 121 and a middle compartment bottom wall 129, extends horizontally between middle compartment side walls 122, and extends in depth from a back wall 127 to a plane created by the front edges of the middle compartment top wall 121, middle compartment bottom wall 129, and middle compartment side walls 122. The walls and the plane define a middle compartment interior casing space 125, which, in the main service module 200, is the interior space of the circuit breaker box 211. The walls 121, 129, 122 have a depth less than or equal to the depth of the frame 100. The middle compartment side walls 122 may be a portion of the frame, a portion of the circuit breaker panel, or a combination of the two.

When the module is shipped for transport to the installation site, a unit panel schedule 140 is placed into the module, preferably into the middle compartment 120, such as attached to the circuit breaker panel 210. The unit panel schedule 140 provides the electrician at the jobsite a guide for installing, as discussed below.

In one aspect, the middle compartment 120 is created by the installation the circuit breaker enclosure casing 211. In this aspect the middle compartment top wall 121 and middle compartment bottom wall 129 are formed by the top and bottom walls of the enclosure casing 211 of the circuit breaker box 210. In another aspect, the middle compartment top wall 121 and the middle compartment bottom wall 129 may be installed within the module exterior frame 100, such as by the installation of a wood or plastic panel, with the circuit breaker box 210 installed below the middle compartment top wall 121 and above the middle compartment bottom wall 129.

The upper compartment 110 extends upwardly from the top wall 121 of the middle compartment 120 to the frame top wall 101 and extends horizontally between the opposing frame side walls 102. The upper compartment 110 extends in depth from the back wall 127 to a plane created by the front edges of the middle compartment top wall 121, the frame top wall 101, and side walls 122. The walls and the plane define a top compartment interior casing space 115 into which multiple coils of electrical wire 170 (module 200) or low-voltage wire 305 (module 300) are mounted that will be stored until the installation of the electrical system within a unit of a building or within a prefabricated wall.

The lower compartment 130 extends vertically from the bottom wall 129 of the middle compartment 120 to the frame bottom wall 109 and extends horizontally between the opposing frame side walls 102. The lower compartment 130 extends in depth from the back wall 127 to a plane created by the front edges of the middle compartment bottom wall 129, the frame bottom wall 109, and opposing middle compartment side walls 122. The walls and the plane define a bottom compartment interior casing space 135 through which electrical wire 170 runs and which, in some aspects of the invention, may also store a coil of electrical wire 170 (in the main service electrical module 200) or low-voltage wire 305 (in the low-voltage module 300).

The steps to form the basic module exterior frame 100 are shown in FIG. 33. In the first step 251, lumber is cut 251 to the specific dimensions of the frame 100 to create the outer wood layer 107 of the frame top wall 101, of the frame bottom wall 109, and of the opposing frame side walls 102. In the case of main service electrical modular assembly 200, the lumber is preferably 2×6 lumber to accommodate the depth of the circuit breaker panel 210. In one aspect of the invention, 2×6 lumber is also used to form the walls 101, 102, 109 of the frame 100 of the low-voltage hub modular assembly 300 and component modular assembly 400. In a preferred aspect of the invention, 2×4 lumber is used to form the walls 101, 102, 109 of the frame 100 of the low-voltage hub module 300 and component module 400. In yet another aspect of the invention, metal of generally the same dimensions may be used to form the walls 101, 102, 109 of frame 100.

In the aspects in which the frame 100 is formed by an outer layer 107 and an inner layer 106 (typically the frame 100 of the main service electrical modular assembly 200 and of the low-voltage hub modular assembly 300), the inner layer 106 is cut in step 252 to correspond to the dimensions (after the outer layer 107 is assembled) of the interiors of the frame top wall 101, the frame bottom wall 109, and the opposing frame side walls 102. In a preferred aspect, the outer layer 107 is cut 251 from lumber and the inner layer is cut 252 from a sheet of fiberglass mat gypsum sheathing. The inner layer 106 thus forms an interior lining to the outer layer 107.

Top plate holes (defined by top plate hole edges 118) and bottom plate holes (defined by bottom plate hole edges 138) are drilled 254 to exact specifications. The top and bottom plate holes are drilled through the lumber of the frame top wall 101 and the frame bottom wall 109, respectively. The specific dimensions of the holes depend on the panel type and the number and type of wires that will be passing through the holes.

In forming the modules that have a frame backing (typically the main service electrical module 200 and the low-voltage hub module 300), the frame backing 105 is then prepared and added to the frame. In a preferred aspect, to form the frame backing 105, a plywood sheet (such as one quarter inch plywood) is cut 253 to fit the specific dimensions of the frame 100 (with dimensions that, when installed, will allow the frame backing 105 to close the back to form a wall).

The outer layer 107 of the walls (which is the lumber cut to form the frame top wall 101, frame bottom wall 109, opposing frame side walls 102) of the frame 100 are assembled in step 255 and fixedly attached, such as by screws and/or adhesive.

In step 256, the inner layer 106 is fixedly attached, such as by screws and/or adhesive, to the interior of the outer layer 107 of the frame top wall 101, frame bottom wall 109, opposing frame side walls 102.

In the preferred aspect of the invention, bracing cleats 108 (FIG. 2) are used, as shown in step 257. For ease of installation of the frame backing 105, at least two and preferably four bracing cleats 108 are cut. Lengths of 1×1 bracing cleat 108 are cut 257 to fit the interior dimensions of at least two and preferably all four of the frame top wall 101, frame bottom wall 109, and the opposing frame side walls 102.

In step 258, the lengths of bracing cleat 108 are then fixedly attached near the rear edges of the frame top wall 101, frame bottom wall 109, and opposing frame side walls 102, but they are offset a small distance from the rear edges of the walls. The offset distance is substantially equal to the thickness of the frame backing 105.

The frame backing 105 is then fitted into the open rectangle formed by the backs of the walls 101, 102, 109, and the outer edges of the frame backing 105 are positioned so that the front of the frame backing 105 is inward of the back edges of the outer walls 101, 102, 109 and against or adjacent to the rear side of the bracing cleat 108. The selected dimensions are such that the back side of the frame backing 105 is positioned flush with the back side of the outer walls 101, 102, 109. Then, with the frame backing 105 abutting the bracing cleat 108, it is attached (typically from the rear of the frame 100 and the backing 105) to the bracing cleat 108 by use of attachment mechanisms, such as of screws, nails, staples, or adhesive. The advantage of this aspect is that the frame backing 105 is inset so that the back of the back surface of the frame backing 105 is flush with, or planar with, the back surface of the outer walls 101, 102, 109. Therefore, the depth of the frame 100 is the depth of the outer walls 101, 102, 109 and is not the depth of the outer walls 101, 102, 109 plus the depth of the backing 105. Consequently, the depth of the module is no deeper than the depth of the wall framing in the unit under construction, so the electrical module can be disposed within a receiving bay in the wall of the unit. This completes the frame 100, which is then preferably checked for quality before being sent to the electrical prefab facility for the installation of the interior components.

Figure 1:
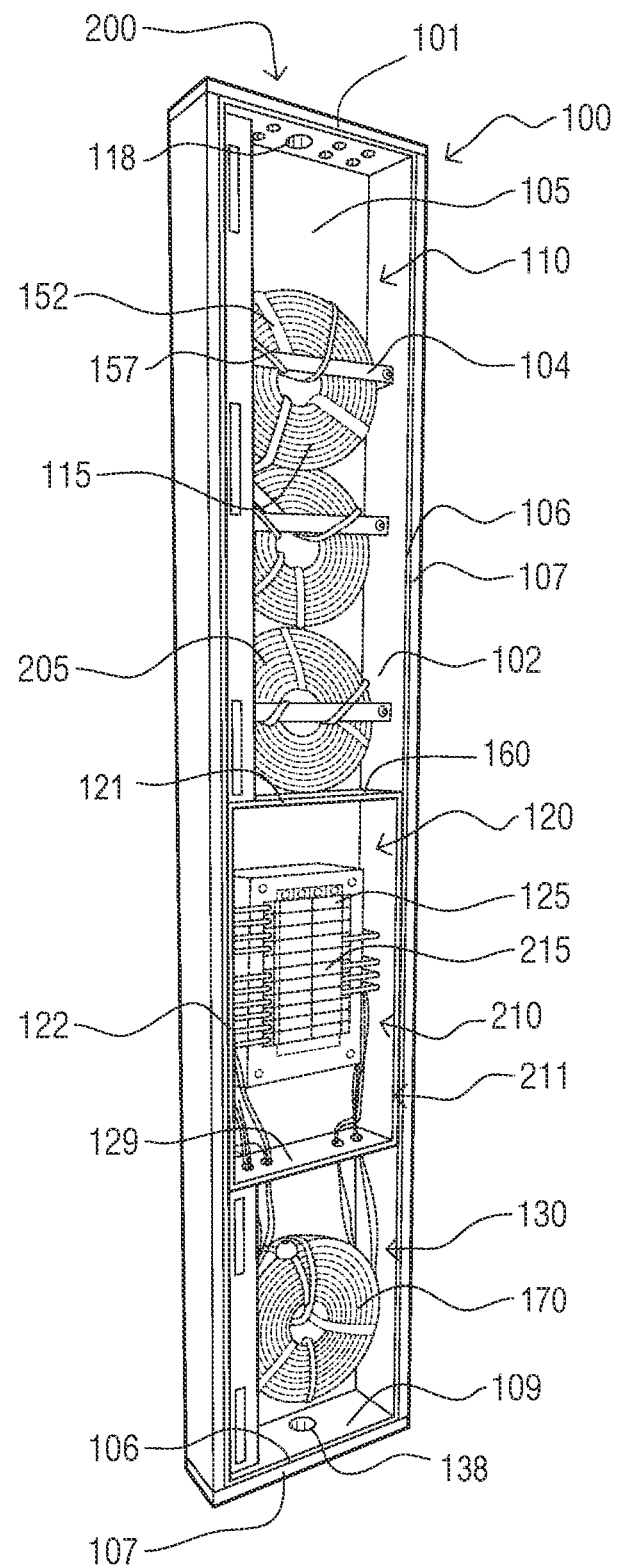
FIG. 1 is perspective front view of an embodiment of the prefabricated main service electrical module of the present invention.
Figure 2:
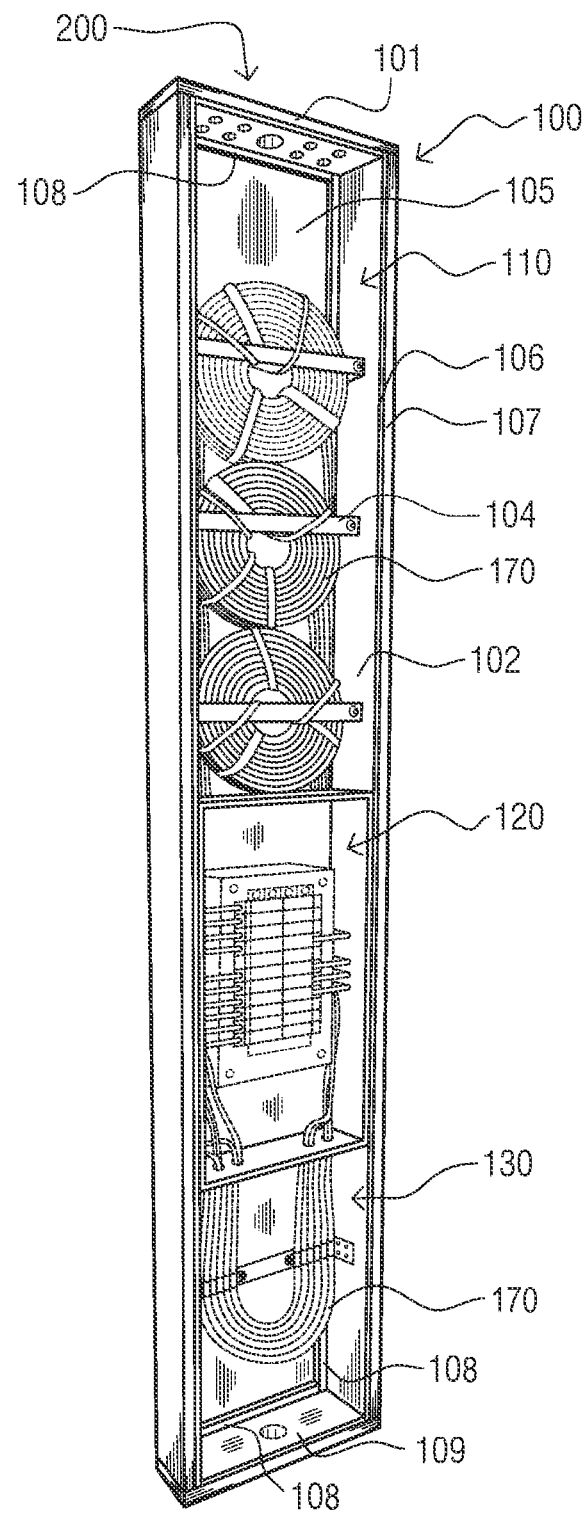
FIG. 2 is a perspective front view of an embodiment of the prefabricated main service electrical module of the present invention.
Figure 3:
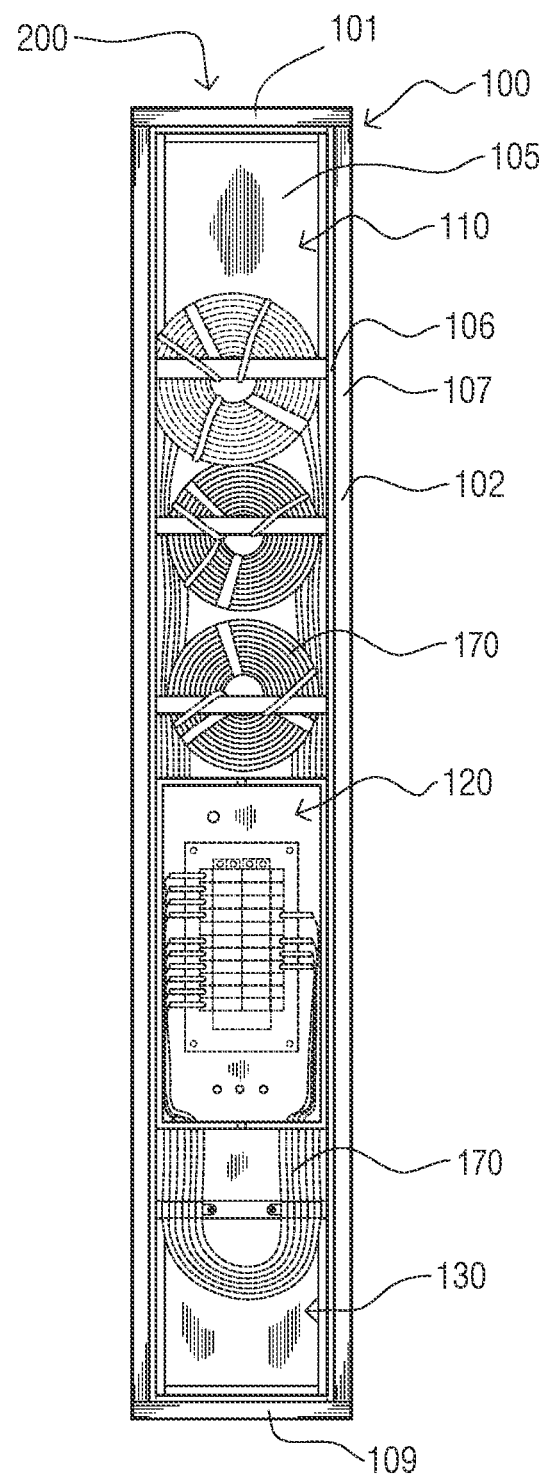
FIG. 3 front view of an embodiment of the prefabricated main service electrical module of the present invention.
Figure 4:
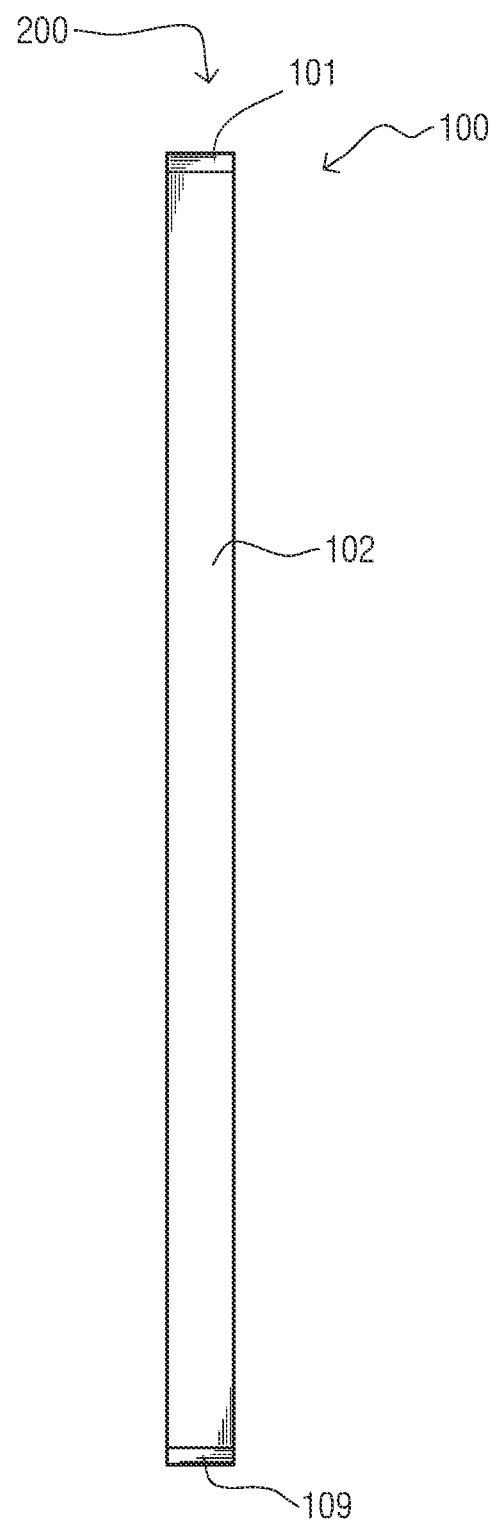
FIG. 4 is a side view of an embodiment of the prefabricated main service electrical module of the present invention.
Figure 5:
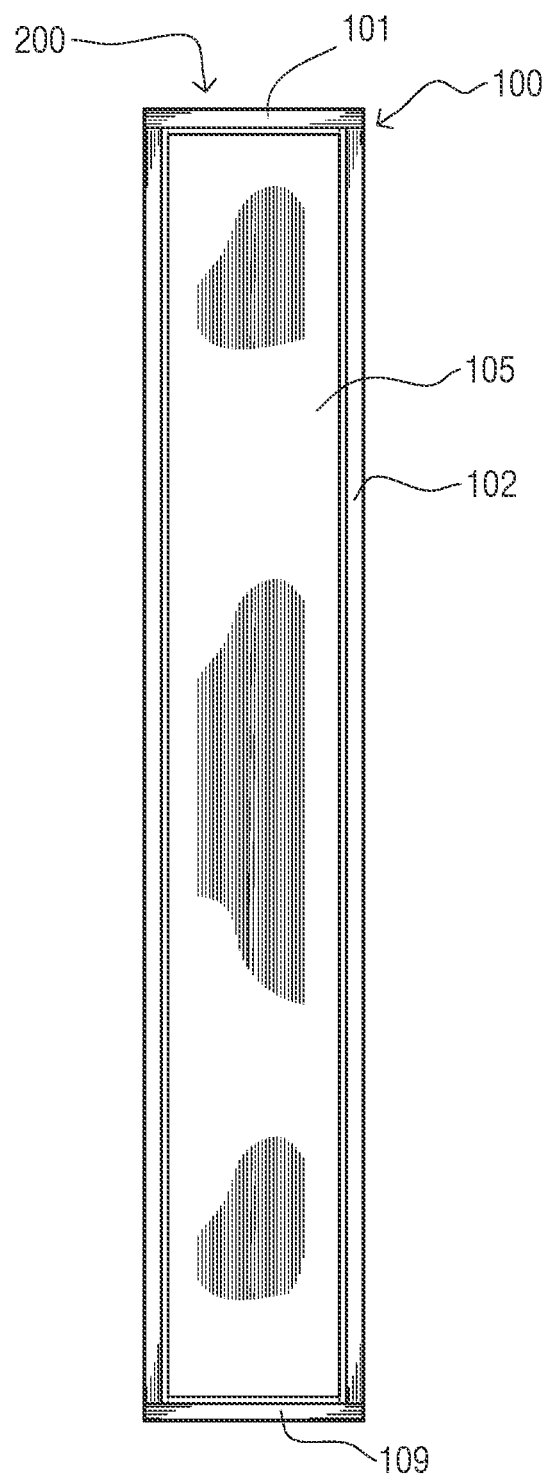
FIG. 5 is a back view of an embodiment of the prefabricated main service electrical module of the present invention.
Figure 6:
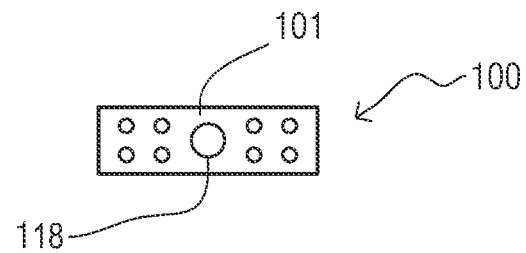
FIG. 6 is a top view of an embodiment of the prefabricated main service electrical module of the present invention.
Figure 7:
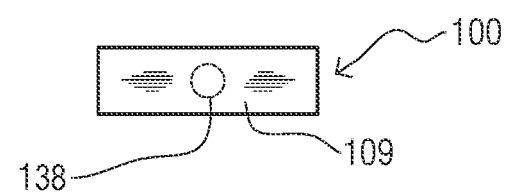
FIG. 7 is a bottom view of an embodiment of the prefabricated main service electrical module of the present invention.
Figure 8:
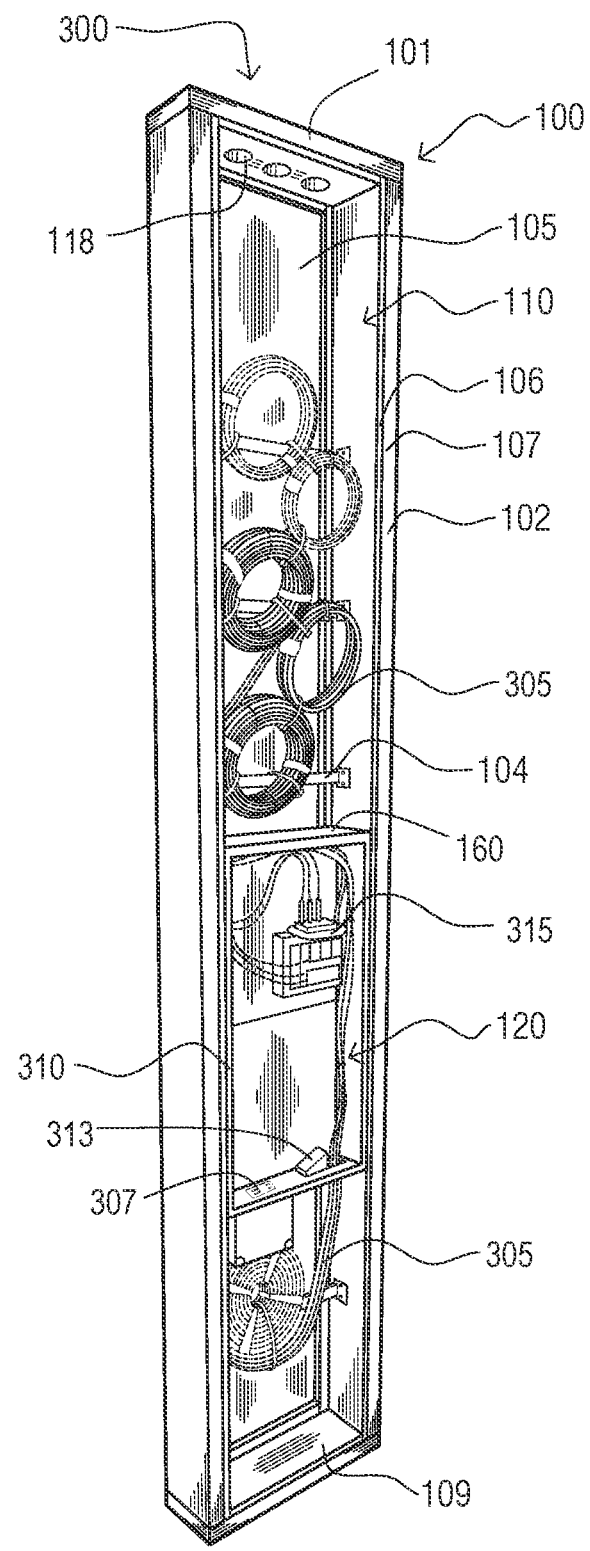
FIG. 8 is a perspective front view of an embodiment of the prefabricated low-voltage hub module of the present invention.
Figure 9:
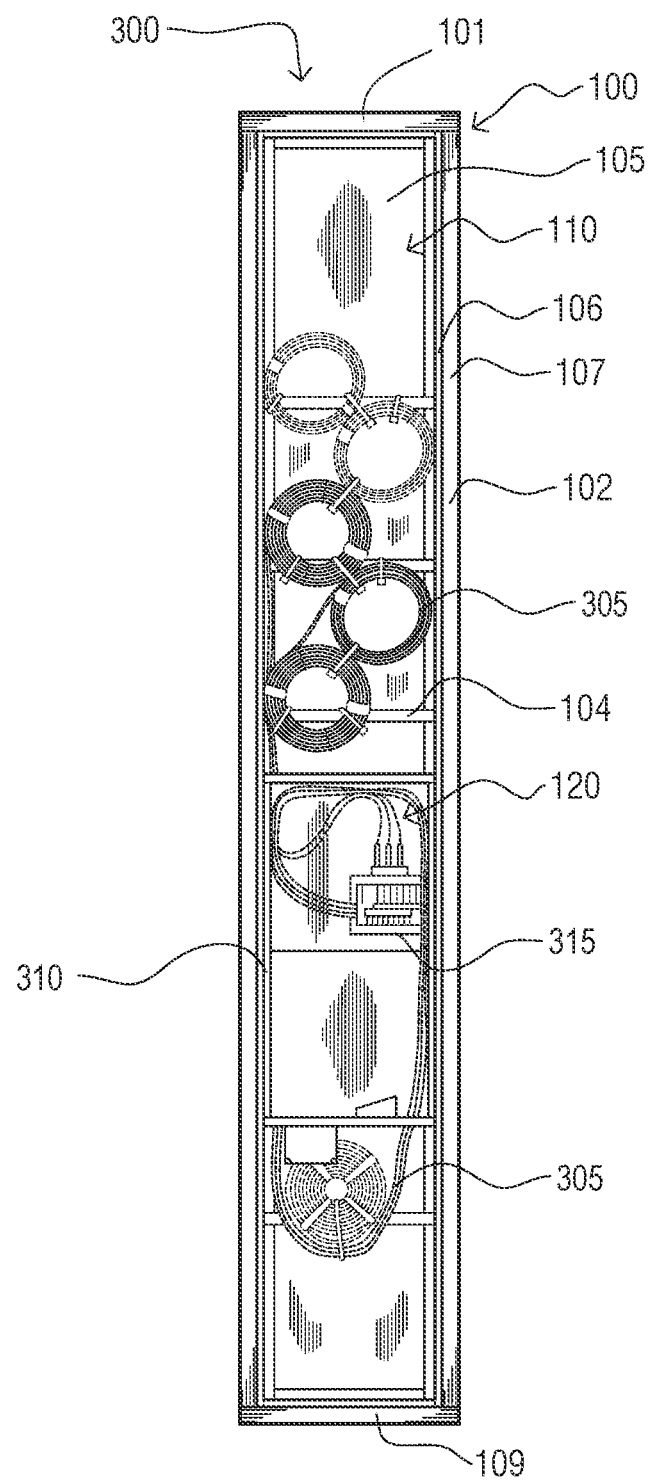
FIG. 9 front view of an embodiment of the prefabricated low-voltage hub module of the present invention.
Figure 10:
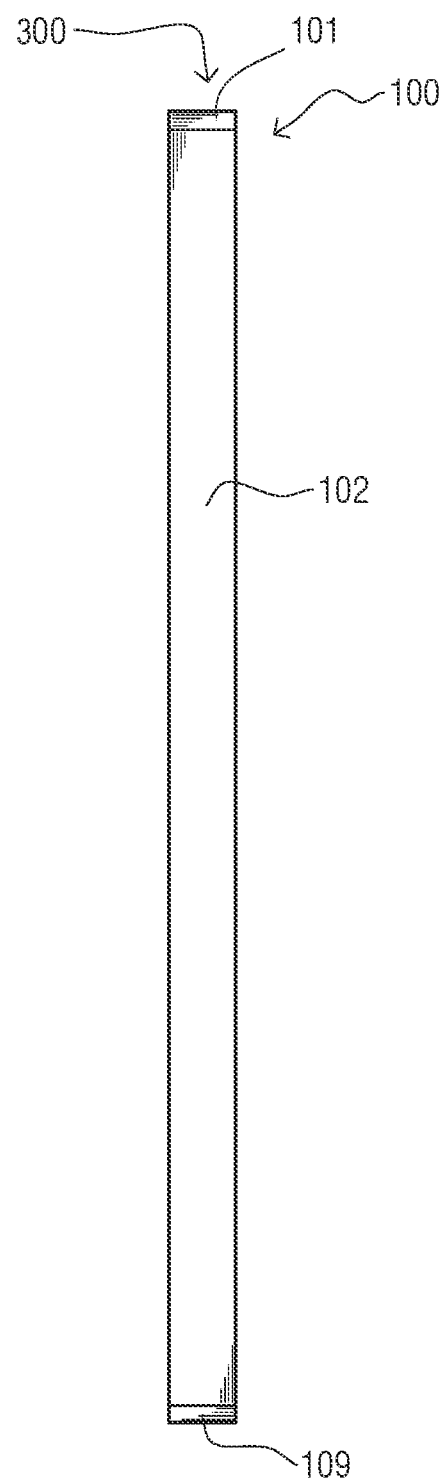
FIG. 10 is a side view of an embodiment of the prefabricated low-voltage hub module of the present invention.
Figure 11:
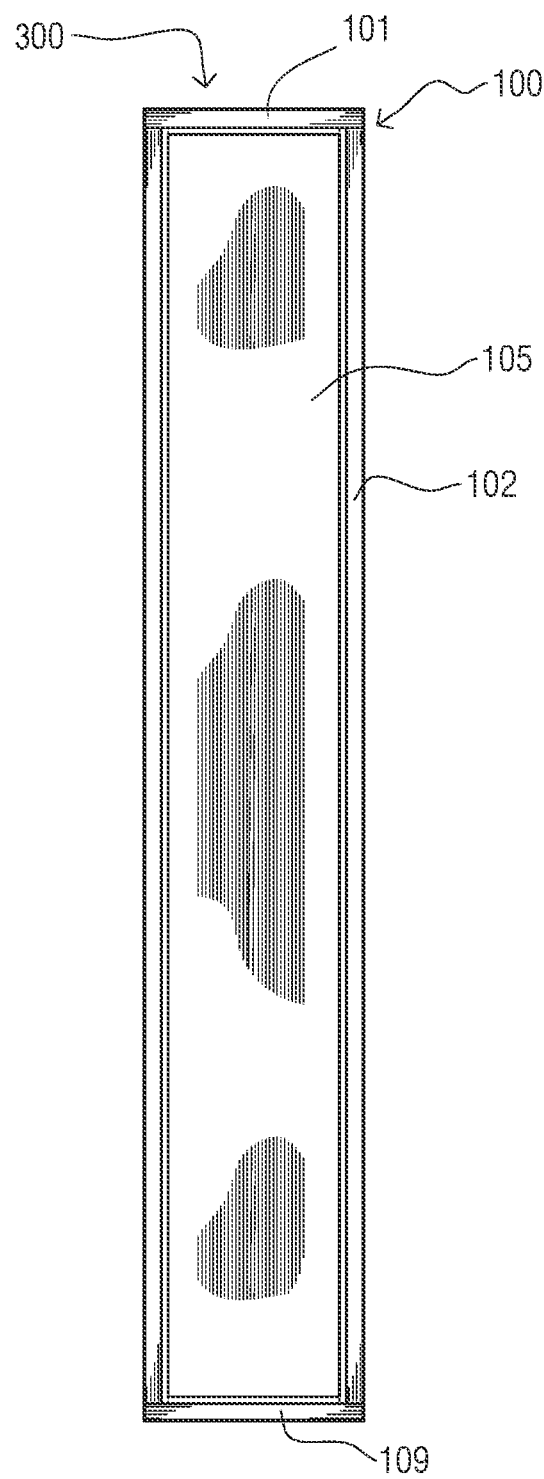
FIG. 11 is a back view of an embodiment of the prefabricated low-voltage hub module of the present invention.
Figure 12:
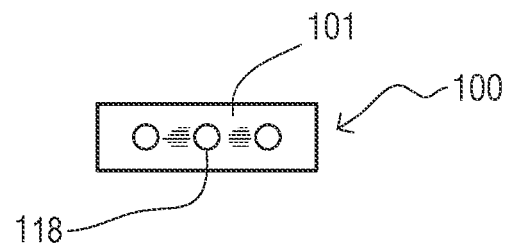
FIG. 12 is a top view of an embodiment of the prefabricated low-voltage hub module of the present invention.
Figure 13:
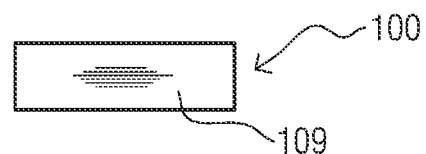
FIG. 13 is a bottom view of an embodiment of the prefabricated low-voltage hub module of the present invention.
Figure 14:
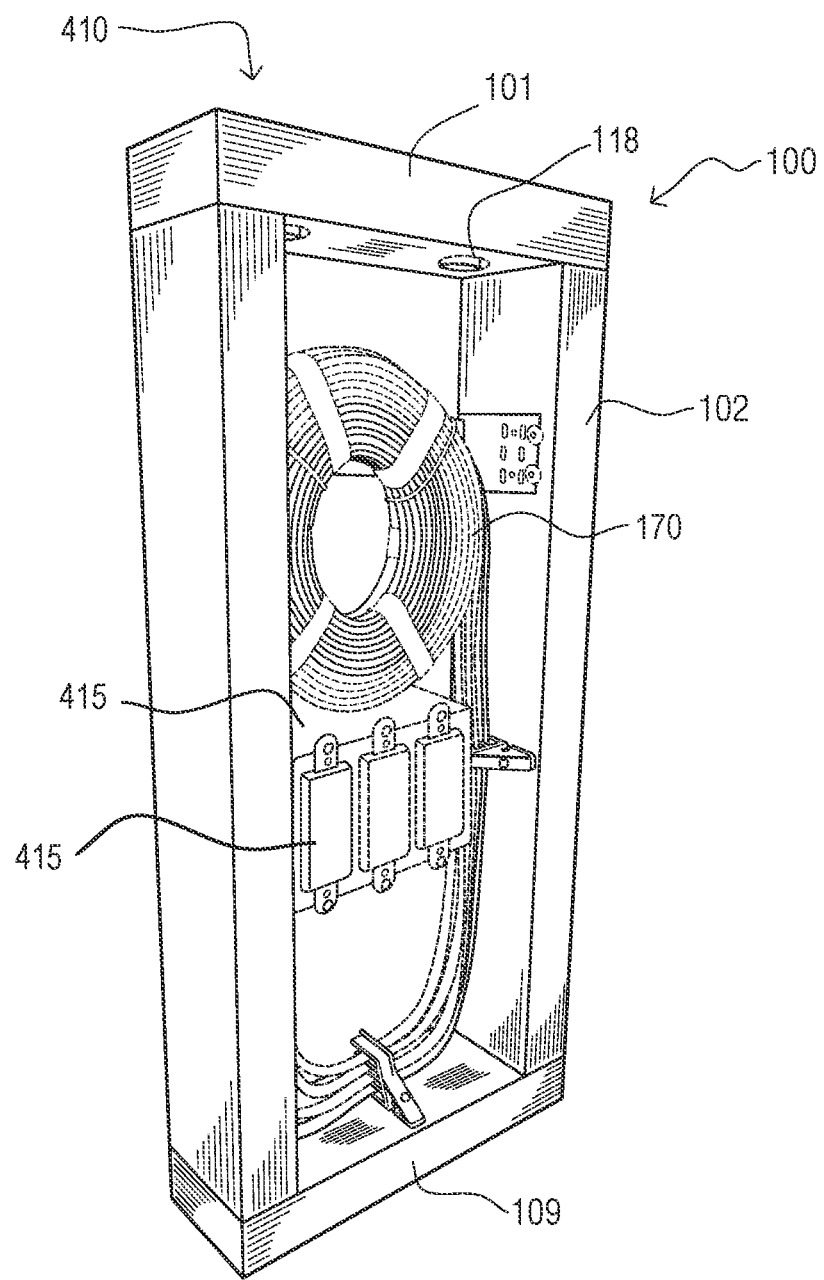
FIG. 14 is a perspective front view of an embodiment of the prefabricated receptacle-type component module of the present invention.
Figure 15:
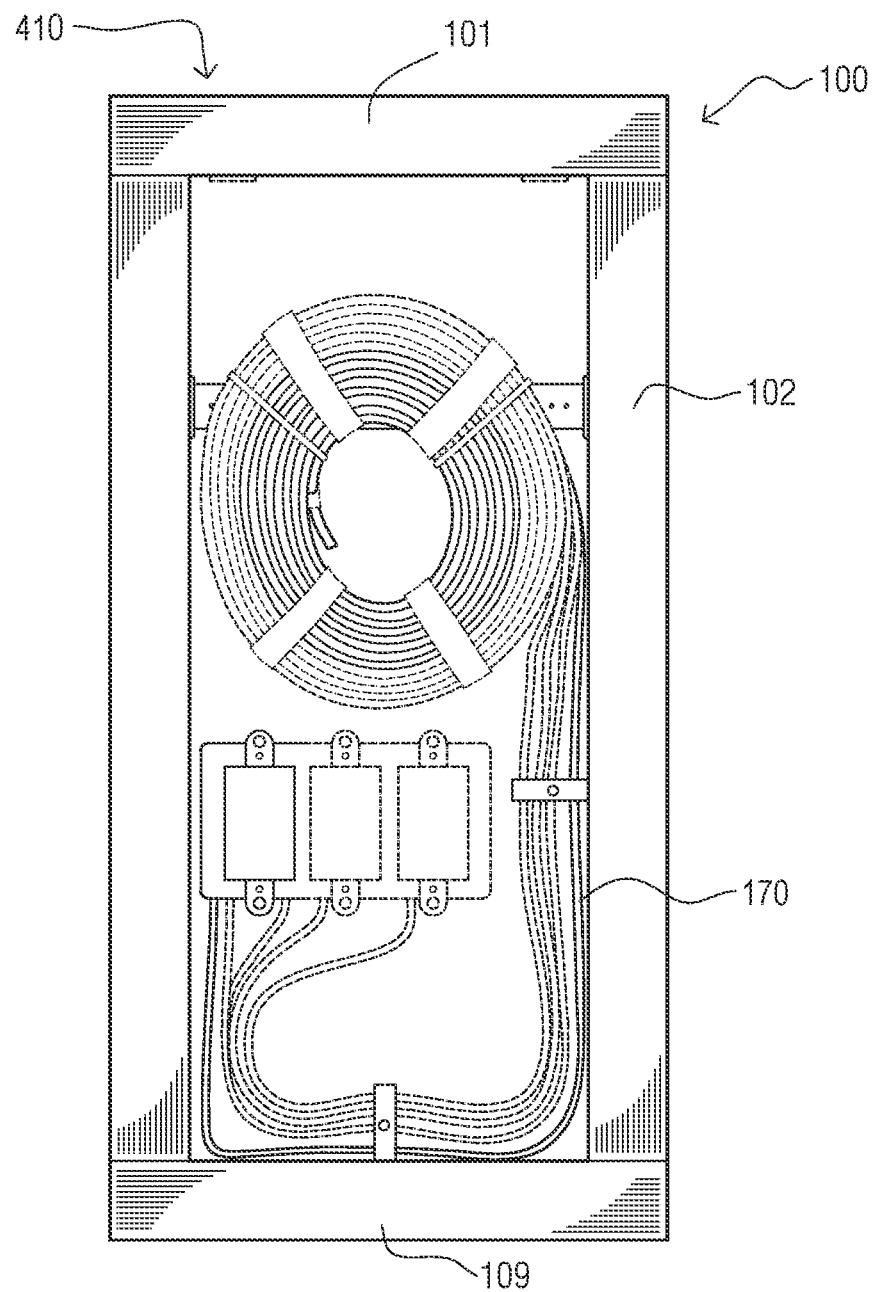
FIG. 15 front view of an embodiment of the prefabricated receptacle-type component module of the present invention.
Figure 16:
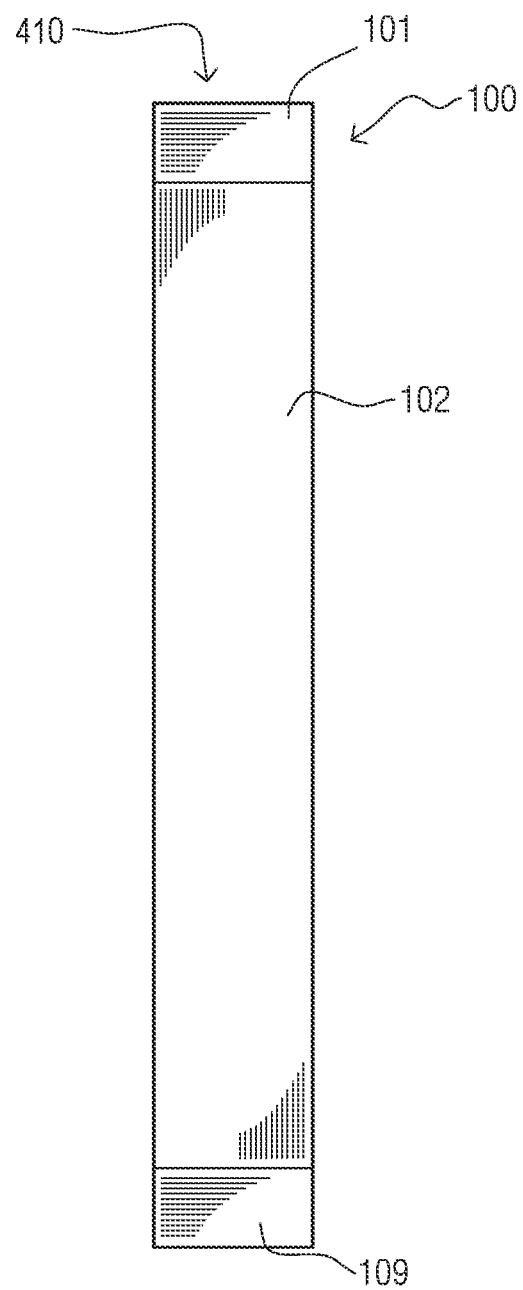
FIG. 16 is a side view of an embodiment of the prefabricated receptacle-type component module of the present invention.
Figure 17:
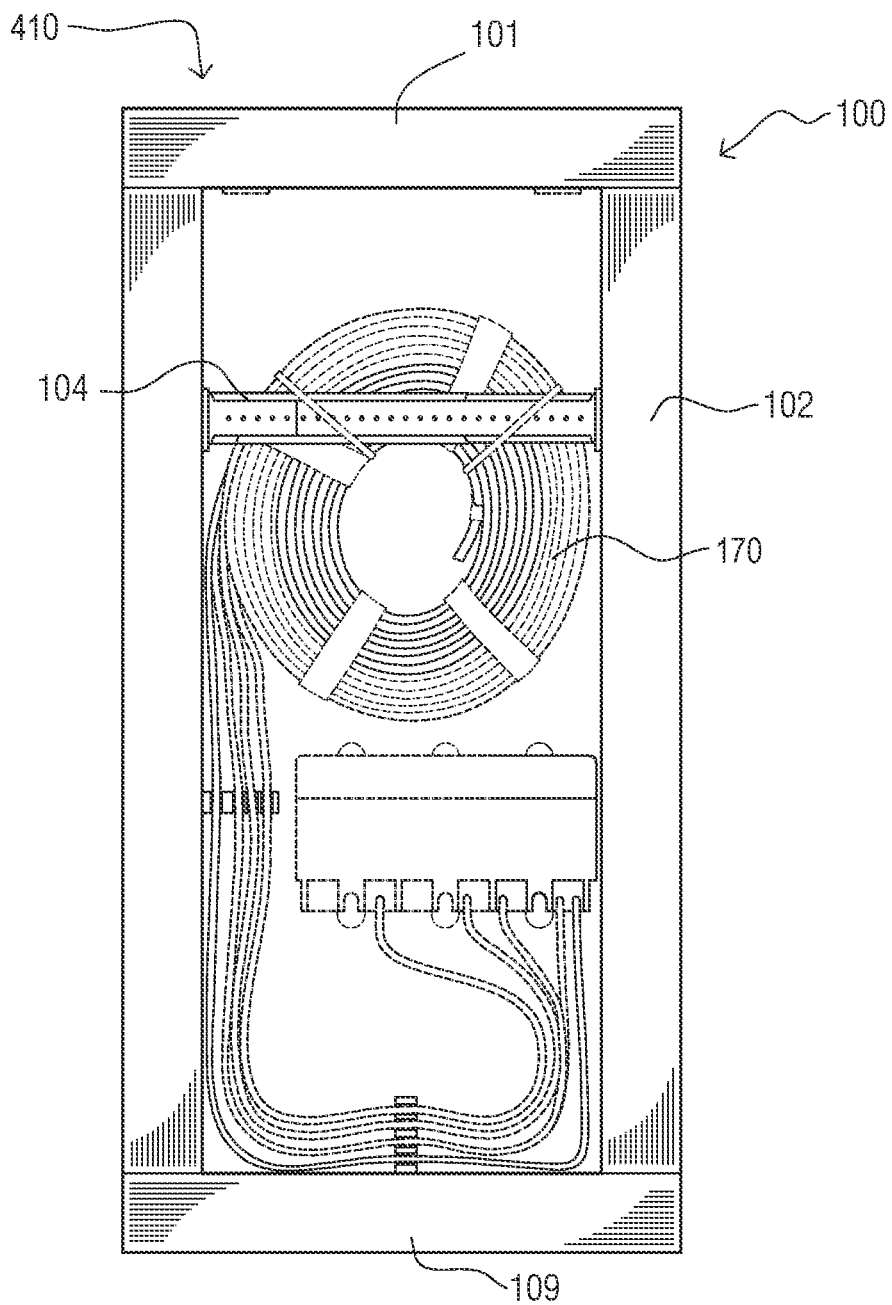
FIG. 17 is a back view of an embodiment of the prefabricated receptacle-type component module of the present invention.
Figure 18:
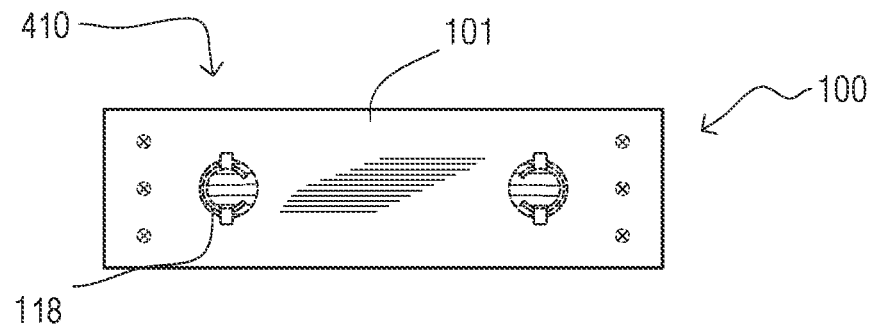
FIG. 18 is a top view of an embodiment of the prefabricated receptacle-type component module of the present invention.
Figure 19:
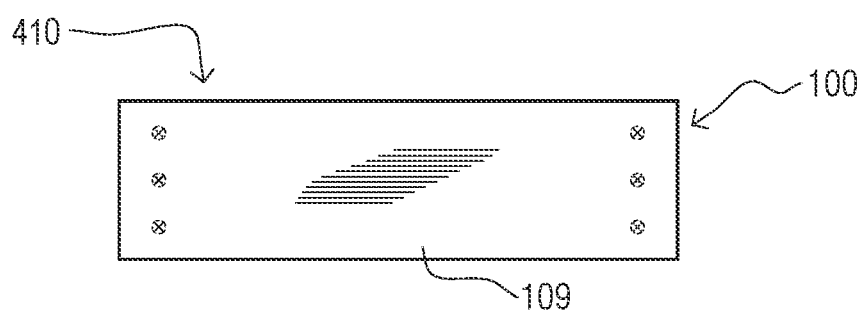
FIG. 19 is a bottom view of an embodiment of the prefabricated receptacle-type component module of the present invention.
Figure 20:
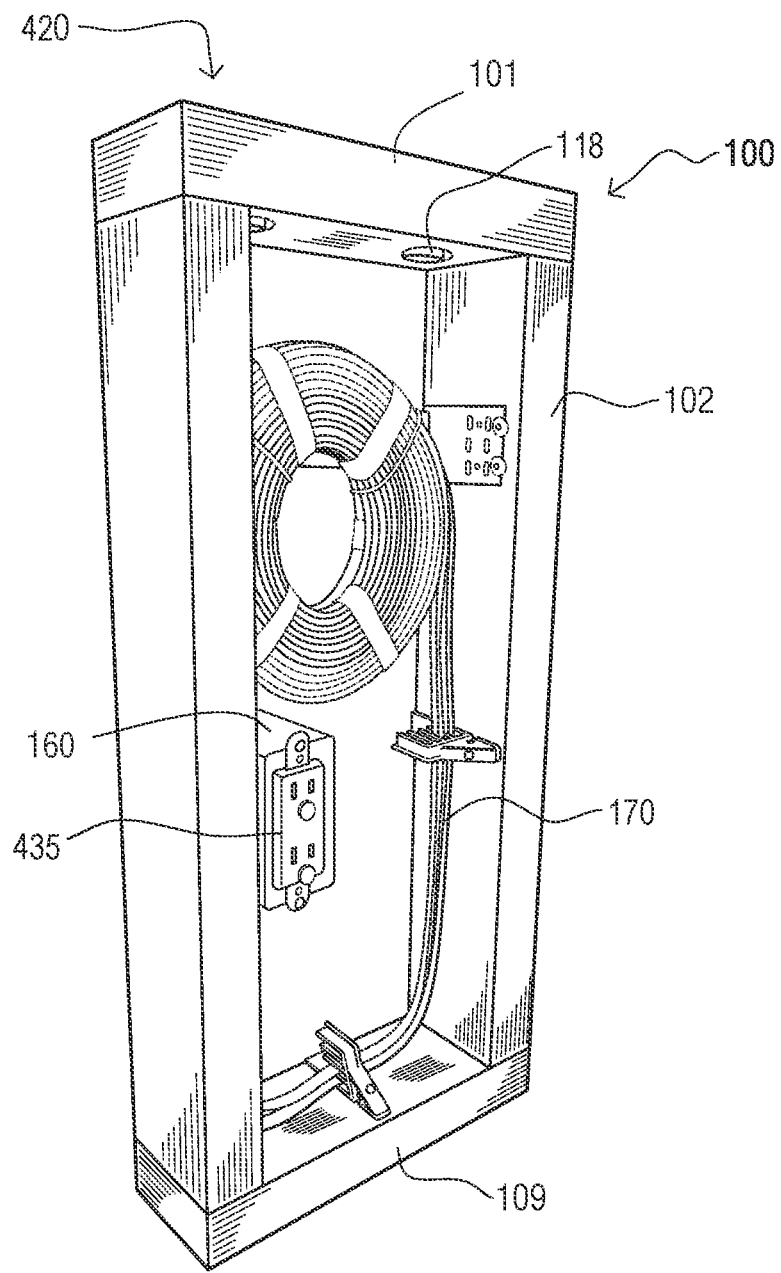
FIG. 20 is a perspective front view of an embodiment of the prefabricated switch-type component module of the present invention.
Figure 21:
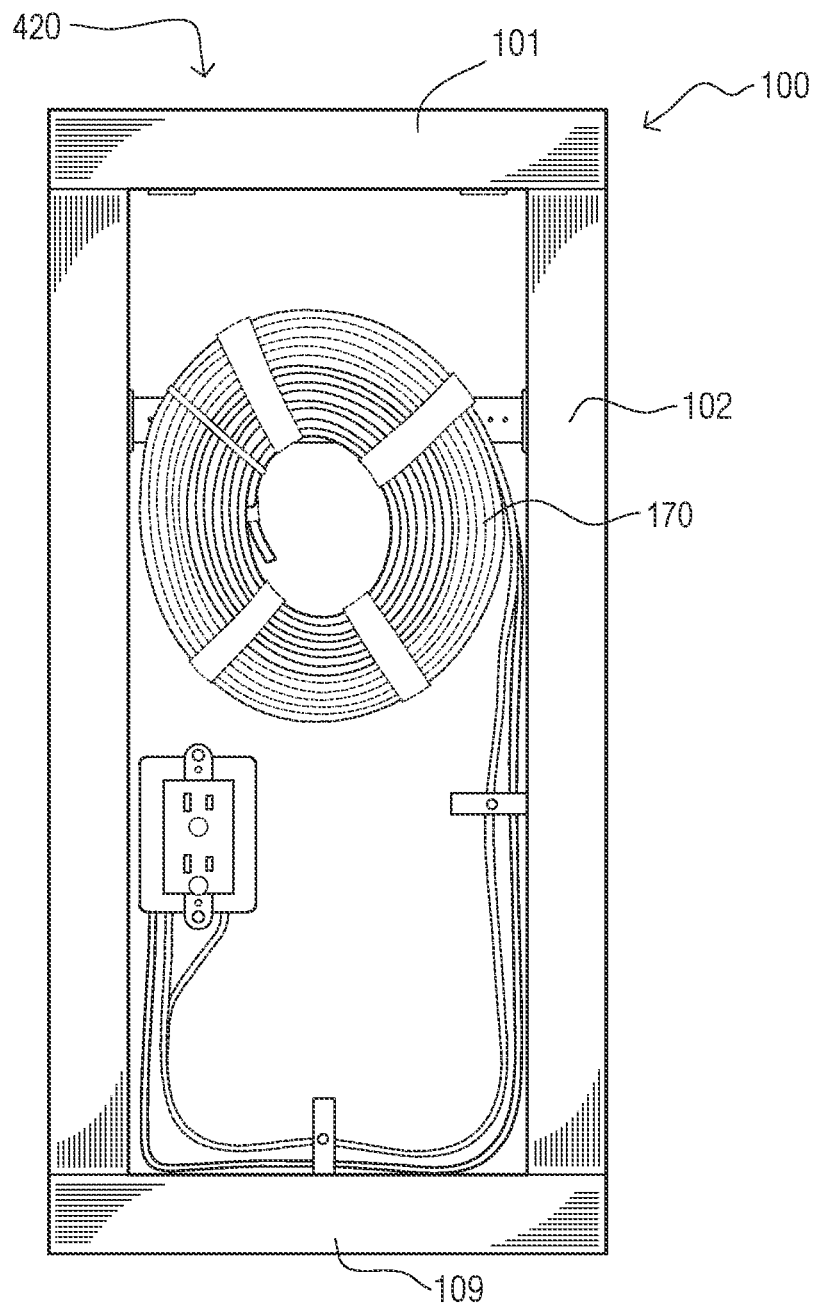
FIG. 21 front view of an embodiment of the prefabricated switch-type component module of the present invention.
Figure 22:
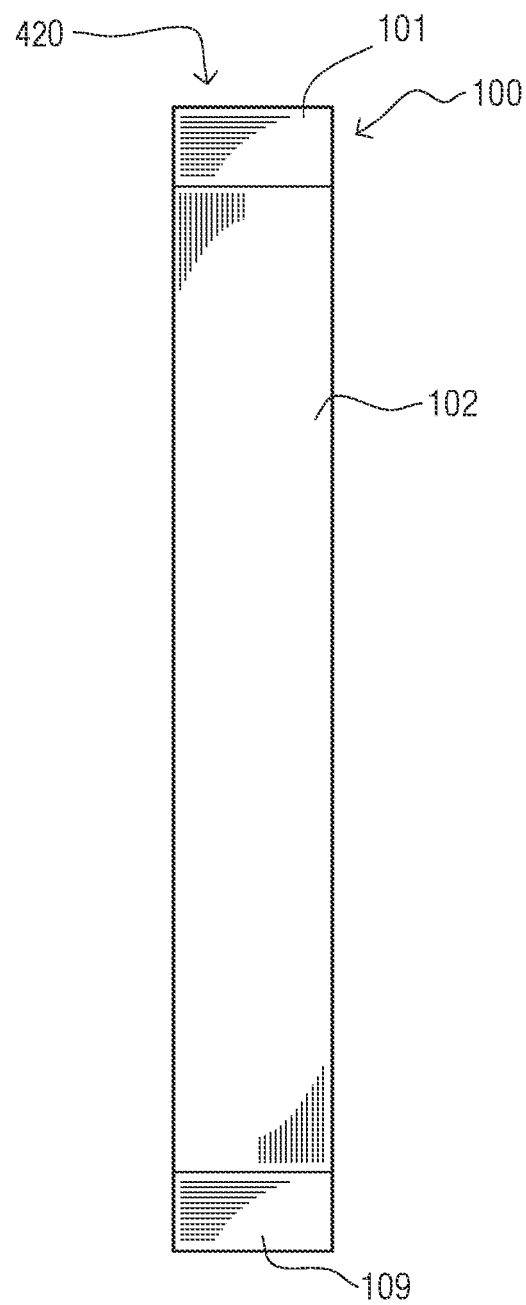
FIG. 22 is a side view of an embodiment of the prefabricated switch-type component module of the present invention.
Figure 23:
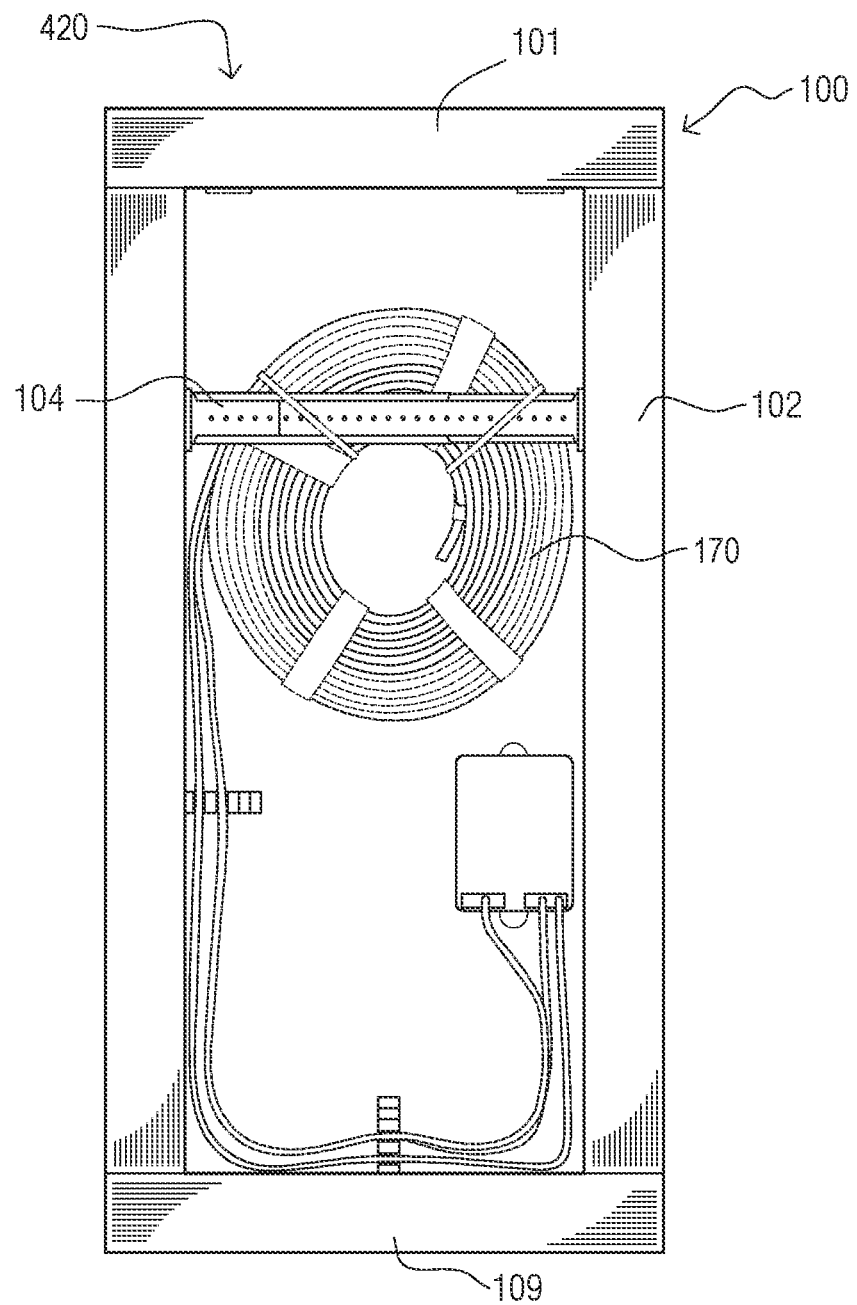
FIG. 23 is a back view of an embodiment of the prefabricated switch-type component module of the present invention.
Figure 24:
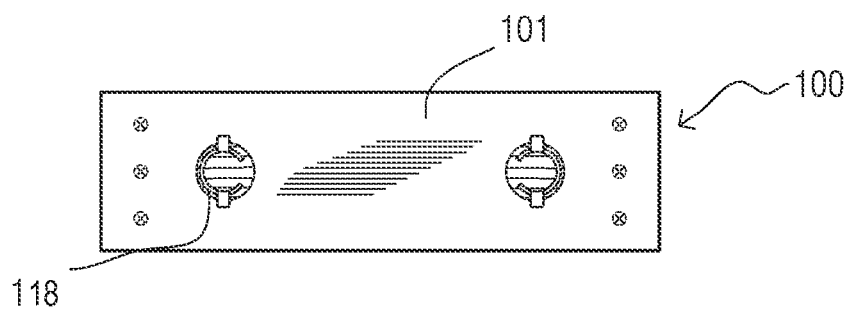
FIG. 24 is a top view of an embodiment of the prefabricated switch-type component module of the present invention.
Figure 25:
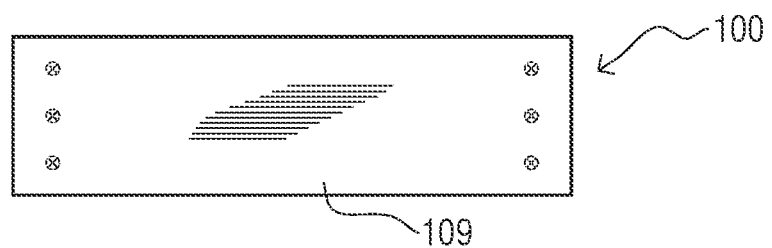
FIG. 25 is a bottom view of an embodiment of the prefabricated switch-type component module of the present invention.

In another aspect of the invention, as seen in FIG. 1, no bracing cleat 108 is used. In one variation, the frame backing 105 is attached directly to the back of the outer walls 101, 102, 109 by use of attachment mechanisms, such as of screws, nails, staples, or adhesive. In this aspect, the frame 100 is deeper by the width of the frame backing 105, but this may be suitable in some situations, such as when the frame is formed of 2×4 material and the bay into which the module will be inserted is formed of 2×6 material.

In a further aspect, the frame backing 108 is cut to fit within the outer walls 101, 102, 109, but no bracing cleat 108 is used. In this aspect the frame backing 108 will be adjacent to the interior of the inner layer 107 and is directly attached by use of attachment mechanisms, such as of screws, nails, staples, L-brackets, or adhesive. This aspect creates a flush back, and the frame 100 is not deeper than the bay in a unit wall into which it will be installed.

In some aspects of the invention (typically the frame 100 of the component module 400) the module exterior frame 100 does not include an inner layer 106 or a frame backing 105. In the aspects in which the frame 100 is formed without an inner frame layer 106 and without a frame backing 105, the lumber for the walls is cut 251, one or more holes (defined by top plate hole edges 118, and/or bottom plate hole edges 118) are drilled 254 into the top plate and/or bottom plate, and the walls 101, 102, 109 are assembled and fixedly attached. The frame 100 is then complete. It is preferably checked for quality and then sent to the electrical prefab facility.

At the electrical prefab facility, at least a portion of the casing enclosure will be weatherproofed and will be mounted into the frame. Steps 260 in the electrical prefab mounting of the electrical components of the main electrical service module 200 are shown in FIG. 34. (Though described in detail in regard to the main service electrical modular assembly 200, variations of the steps are also used in forming the other modules 300 and/or 400.)

A module exterior frame 100 is selected and associated with a particular unit of the building that is to be constructed. The frame 100 is marked with the pertinent unit-specific information 131 (FIG. 27) associated with the particular unit which will receive this specific main electrical service module 200, as shown in step 261. This unit-specific information 131, may be applied to the top, bottom, or sides of the frame 100, though it is preferred to mark the bottom of the frame 100, as illustrated. The labeling may include any or all of the following labeling of the frame: the name of the building into which the main electrical service module 200 will be installed, the name of the construction project, the name of a phase of a project, the building owner's name, the number or name of the unit, the type of electrical module 200, 300, and/or 400, and/or other relevant unit-specific information 131 that is important to convey to the installing electrician. In one preferred aspect markings applied to the bottom of the frame are the project name, unit number, any section number, and type of main electrical service module.

Figure 28:
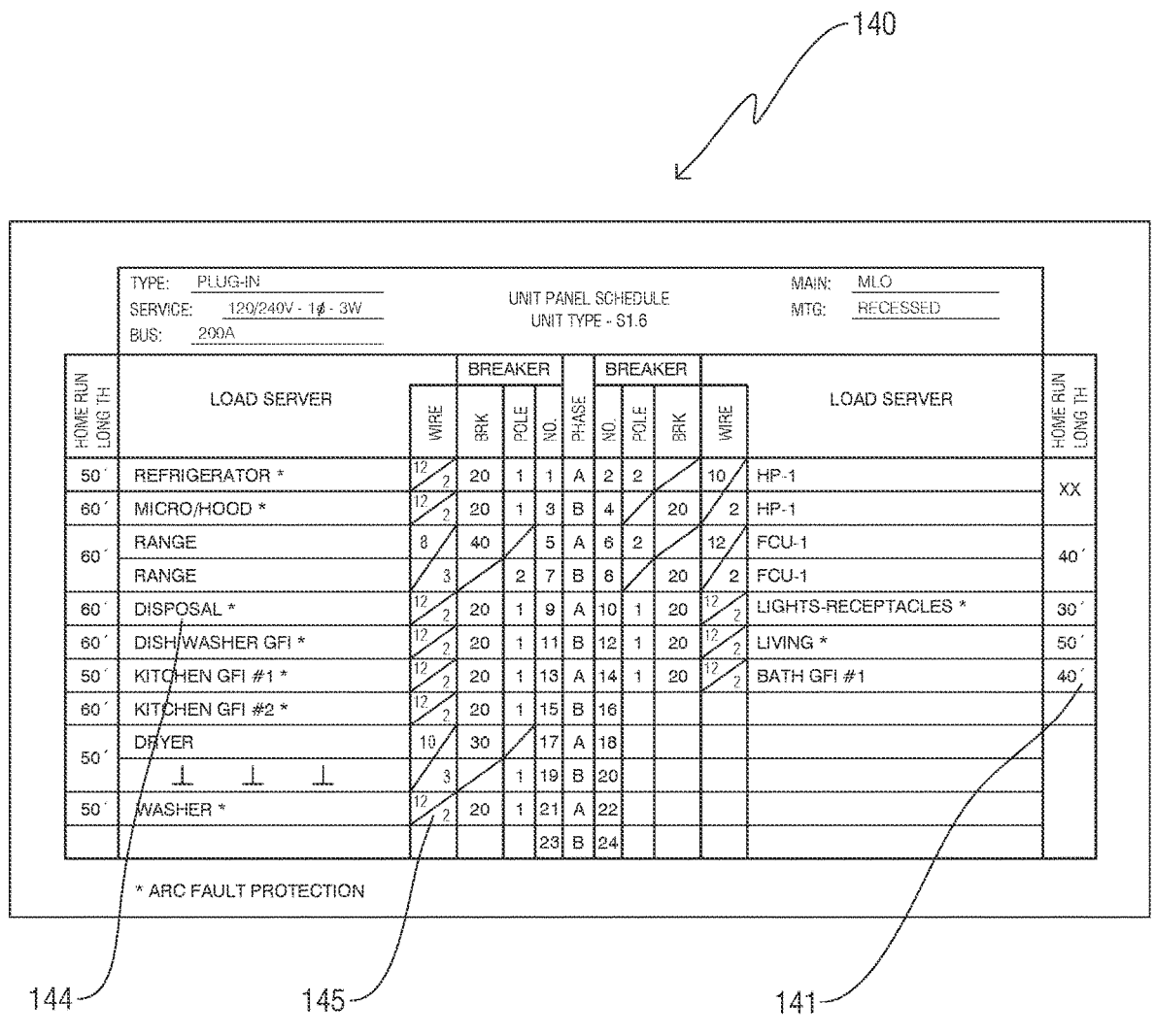
FIG. 28 is a front view of a unit panel schedule utilized in the installation of the prefabricated electrical modules of the present invention.

In step 262 of FIG. 34, a panel schedule 140 (FIG. 28) for the specific unit of the multi-unit construction is prepared (based on earlier design planning) for attaching within the module. It will be used both by the prefab electricians to complete the module and by the electricians at the construction site to install the module 200 (or the electricians at the prefab wall facility). The unit panel schedule 140 (an example of which is illustrated in FIG. 28) is a panel list with information that guides the electrician on installation of the main electrical service module 200. It includes such information as the unit type, load servers 144, breaker 145, and color-coded home run wire footages 141. The unit panel schedule 140 is printed out and preferably laminated for jobsite durability. Then it is attached within the main electrical service module 200, such as by a zip tie.

In step 263 of the electrical prefab steps 260 of FIG. 34, waterproof membrane 160 is applied to at least a portion of the enclosure casing 211 of the circuit breaker panel 210 (for the main service electrical modular assembly 200, or to the enclosure casing 310 of the low-voltage enclosure when fabricating the low-voltage hub modular assembly 300). Specifically, the waterproof membrane 160 is applied to the top and back walls of the circuit breaker panel 210 that will be mounted within the main electrical service module 200. The waterproof membrane 160 may comprise any thin waterproof material that self-adheres or can be adhered to the outside top and back of the circuit breaker panel 210. In a preferred aspect of the invention, the waterproof membrane comprises a self-adhering roofing underlayment, such as sold under the trademark of GRACE ICE & WATER SHIELD. In this aspect, the self-adhering roofing underlayment is formed of a rubberized asphalt adhesive backed by a layer of release film that protects its adhesive quality, which supplies dual protection. The modified bitumen forms a watertight seal even if there is an accidental puncture of the waterproof membrane 160. The release film is easily removed, which allows the rubberized asphalt layer to bond tightly to the back and sides of the enclosure casing 211 of the circuit breaker panel 210.

In step 264, using the unit panel schedule 140 to determine the wire lengths needed, the electrical wiring 170 is then cut in footages that match the footages listed on the panel schedule 140 for each unit. The cut wiring is coiled and is ready to install within the module.

In step 265 of FIG. 34, spreader bars 104 are installed within the frame 100. They may be installed between opposing side walls 102, attached to one opposing side wall 102, or attached to the back wall 109. Each spreader bar 104 may be installed toward the front, middle, or the rear of the frame 100. The previously cut lengths of coiled wiring 170 will be secured to the spreader bars 104.

In step 266 the circuit breaker panel 210 is mounted into the frame 100. The circuit breaker panel 210 is mounted at a particular height that satisfies the local regulations in affect at the location of the unit. For example, in some localities, the top of the circuit breaker box may not be higher than 6 foot, 7 inches from the floor.

In step 267, an electrician at the electric prefab facility follows the specifics of the unit panel schedule 140 to connect the proximal end of each wire to the proper breaker of the circuit breaker panel 210. The circuit breaker panel 210 is completely wired and labeled with stickers designating the circuit (such as labeling the kitchen, bathrooms, air conditioner, bedroom, oven, etc. circuits). The proximal end of a section of wiring (of the correct length based on the unit panel schedule 140 corresponding to the module being fabricated) is attached to the circuit breaker 215. The remainder of the wiring 170 (past the attached proximal end) is extended away from the breaker and is secured within the interior of the module. In a preferred aspect, the wire remainder runs through the exit holes 138 in the middle compartment bottom wall 129, which is the bottom wall of the circuit breaker panel in this embodiment. In a preferred aspect, the wiring 170 is looped in the bottom compartment and held by support spreader bars in the bottom compartment, is routed behind the circuit breaker panel 210, and is brought upward behind the circuit breaker casing enclosure, is coiled for storage, and is attached to spreader bars in the upper compartment 110 of the frame 100. This routing allows the openings in the bottom of the circuit breaker panel to be used (making weatherproofing easier) and allows some length of the wiring to be stored below the circuit breaker panel, but yet allows most of the wiring to be stored in coils in the more spacious area above the circuit breaker panel.

In step 268, the cut wiring 170 is coiled and marked with a colored identifying agent, such as colored tape, colored tie(s), or the like. For conformity and ease of use, the colored identifying agent also coordinates with the color of the location and/or the color designating a wiring length of the panel schedule 140. Preferably, the color of the colored identifying agent corresponds to a particular length and corresponds to the color of the wiring length on the panel schedule 140, to aid the electrician at the job site. For example, red colored tape is attached to the coil of wire that has been connected to the breaker for the dining room, and the dining room name and/or coil length is designated with red highlighting or coloring on the panel schedule. This greatly reduces error in the onsite installation.

In step 269, the coils of wiring 170 are attached to the spreader bars 104 to stow the wiring 170 in a tidy and organized manner for shipping to the construction site.

Completion of step 269 completes the fabrication of the main electrical service module 200. The main electrical service module 200 may be then prepared for transport. A rubber strip for weatherproofing is preferably applied around the face of the circuit breaker panel 210, and a temporary metal cover is screwed down onto the face of the circuit breaker panel 210 with tamper-proof self-tapping screws. Cardboard and/or plastic may be installed over all or part of the front of the module 200 to secure and protect the interior elements during transport. Particularly, the open top compartment no and open bottom compartment 130 may be covered. A plastic membrane may be wrapped around all or part of the module 200 if desired.

Using the unit panel schedule 140 and the unit layout as a guide, the other modules 300, 400 that are needed for installation into the same unit are also fabricated.

The fabrication of the low-voltage hub module 300 follows similar steps to the steps of the fabrication of the main electrical module 200 with some modifications. In an example, a frame 100 is formed of an outer layer of 2×4 lumber, an inner layer of fiberglass mat gypsum sheathing, and a frame backing 105 of plywood. The frame is inspected and sent to the electrical prefab facility, where the interior elements of the low-voltage hub module 300 will be mounted within the frame 100. The interior elements include the low-voltage enclosure casing 310 (which will be weatherproofed) carrying the low-voltage data/video/phone assembly 315. Disposed within the enclosure casing is one or more components and/or connections for data lines (such as DSL, fiber, cable, lines from an Internet Service Provider (ISP), or other lines supplying data), video lines (such as cable television), phone lines (such as landline telephone), and similar low-voltage components and/or connections.

In similarity to step 260, the frame 100 is properly labeled with pertinent information 131. In similarity to step 262, a unit layout for the specific unit of the multi-unit construction is prepared based on earlier design planning. It is attached within the module 300. The printed, laminated unit layout will be used by both by electricians at the electrical prefab facility as they fabricate the module and by the electricians at the construction site as they install the low-voltage module 300.

In similarity to step 263 a weatherproof membrane 160 is applied to the top and rear surfaces of the low-voltage enclosure casing 310. This causes the enclosure casing 310 to become weatherized and/or watertight.

In similarity to step 264, using the unit layout to determine the lengths of low-voltage wiring 305 needed, lengths of low-voltage wiring 305 are then cut in footages that match the footages listed on the unit layout for each unit.

In similarity to step 265 of FIG. 34, spreader bars 104 are installed within the frame 100 between opposing side walls 102, attached to the side walls 102, or attached to the front of the frame backing 105. The spreader bars 104 support the coils of low-voltage wiring 305.

In similarity to step 266 the low-voltage enclosure casing 310 is mounted into the frame 100. Before mounting, knockouts are removed from the bottom of the enclosure casing 310 to accommodate an electrical outlet receptacle and to create exit holes to accommodate the exit from the enclosure casing 310 of the low-voltage wiring 305. The electrical receptacle 307 is installed in one of the bottom knockouts. A cable entrance plate 313 for routing cables out of the bottom of the enclosure casing 310 is installed in another bottom exit hole.

In similarity to step 267, a section of low-voltage wiring 305 of the correct length (based on the unit layout) is wired to provide power to the receptacle 307 of the low-voltage enclosure casing 310 with the additional wiring 305 coiled and stored within the module 300. Other lengths of wiring 305 are connected to the connections of the low-voltage data/video/phone assembly 315 and are routed through the cable entrance plate 313 to be stored in the bottom of the module 300. Further lengths of low-voltage wiring 305 that will be needed may be stored in the upper portion of the module 300. In similarity to step 268, the cut lengths of the low-voltage wiring 305 are coiled and marked with colored tape that corresponds to a particular length, with the color corresponding to the color designated on the unit layout.

In similarity to step 269, the coils of low-voltage wiring 305 are attached to the spreader bars 104 for storage and to hold the low-voltage wiring 305 secure while the module 300 is being shipped to the construction site.

The fabrication of the component modules 400 follow similar steps to the steps of the fabrication of the main electrical module 200 with some modifications.

At the electrical prefab facility, the interior elements of the component modules 400, are typically mounted into a smaller, backless version of the frame 100, and the components will be weatherproofed. In similarity to step 260, the frame 100 to be fabricated is properly labeled with information 131 pertinent to the unit and type of module.

In the switch component module 410, a gang box of the proper size (such as one-gang, two-gang, three-gang, etc.) for the module 410 being fabricated (as identified and specified in the unit layout) is selected. The bracket portion of the gang box that typically sits on the face of the stud is removed.

In similarity to step 263 a weatherproof membrane 160 is applied to the top surface of the gang box to waterproof the gang box. In similarity to step 264, the unit layout is used to determine the lengths of electrical wiring 170 needed. Lengths of electrical wiring 170 are then cut in footages that match the footages listed on the unit layout for each unit. Lengths of 12/2 and 12/3 UF wire is preferably used.

In similarity to step 265 of FIG. 34, spreader bars 104 are installed within the frame 100 for supporting coils of electrical wiring 170 needed at the installation site.

In similarity to step 266 the gang box is mounted at a pre-marked height by screwing it into the interior of the side wall 102 of the frame 100. Round nail plates are hammered into the holes of the top plate to protect the wiring 170 that will be routed through the holes.

In similarity to step 267, sections of wiring 170 of the correct length (based on the unit layout) are routed into the gang box and secured with cable stackers and zip ties. For example, for a three-gang box, three runs of 12/2 UF and two runs of 12/3 UF are routed into the three-gang box. The ends of the wiring are stripped and connected to the switches, which are then screwed into the gang box.

A temporary cover is preferably installed over the switch or switches. Self-adhering material or adhesive or tape with plastic sheeting may be disposed around all sides of the gang box and over the entirety of the switches to ensure that the electrical components are weatherproof.

The wiring 170 is coiled and marked with colored tape that corresponds to a particular length. In similarity to step 269, the coils of electrical wiring 170 are attached to the spreader bars 104 for storage and to hold the wiring 170 secure while the module 400 is being shipped to the construction site.

The fabrication of the receptacle component modules 430 follow similar steps to the steps of the fabrication of switch component module 410, but instead of stripping the wiring 170 and attaching it to a switch, the wiring 170 is stripped and attached to a receptacle. The receptacle is screwed into the gang box, which may be a one-gang, two-gang, three-gang, etc. box.

After preparation of the main electrical module 200, the low-voltage hub module or modules 300, and any multiple switch and receptacle component modules 400, the completed modules 200, 300, and/or 400 for one housing or office unit are gathered and are palletized for shipping out to the unit for installation.

When the one or more pallets of modules 200, 300, 400 are received at a multi-unit building site, the pallets are hoisted into the partially constructed building. Before the roof, walls, and windows are complete, the electricians can begin to install the modules 200, 300, 400 using the included circuit panel schedule 140 and unit layout (which is similar to the panel schedule in that it includes information on locations, wire coil length, and the like for use by onsite electricians).

The standardization of the modules 200, 300, and/or 400 and fabrication in a facility reduces material waste and increases consistency and uniformity.

Because the modules 200, 300, and/or 400 have been weatherized, there is no need for the onsite electricians to wait for dry in. The electrical installation can start weeks to months earlier, and the rough electrical inspection can be performed weeks to months earlier. In consequence, the inventive modules compress the construction timeline and save construction costs.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A prefabricated electrical module, comprising:
a module exterior frame comprising four frame walls including a frame top wall, two opposing frame side walls, and a frame bottom wall;
an enclosure casing mounted within said module exterior frame and accommodating a low-voltage data/video/phone assembly or a circuit breaker panel comprising multiple circuit breakers; said enclosure casing comprising a casing top surface and a casing bottom wall configured with at least one exit hole defined by exit hole edges; and
multiple lengths of wiring, with each of said multiple lengths of wiring comprising a wiring proximal end and a wiring remainder; wherein said wiring proximal end is attached within said enclosure casing; wherein a first portion of said wiring remainder is disposed through said at least one exit hole; wherein a last portion of said wiring remainder is coiled and secured within said module exterior frame.

2. The prefabricated electrical module as recited in claim 1, further comprising a waterproof membrane affixed to at least said casing top surface.

3. The prefabricated electrical module as recited in claim 1, wherein said frame top wall, said two opposing frame side walls, and said frame bottom wall each comprise a wall outer layer and a wall inner layer disposed adjacent to an interior of said wall outer layer.

4. The prefabricated electrical module as recited in claim 3, wherein:
said wall outer layer comprises wood; and
said inner layer comprises fiberglass mat gypsum sheathing.

5. The prefabricated electrical module as recited in claim 1, wherein said enclosure casing accommodates said low-voltage data/video/phone assembly.

6. The prefabricated electrical module as recited in claim 1, further comprising a unit circuit panel schedule for a specific unit to be constructed removably attached within said module exterior frame and displaying electrical information for said specific unit; wherein:
said enclosure casing accommodates said circuit breaker panel;
said wiring proximal end is attached to one of said multiple circuit breakers;
each of said multiple lengths of wiring has a length defined by said unit circuit panel schedule.

7. The prefabricated electrical module as recited in claim 6, wherein:
a second portion of said wiring remainder is disposed behind said circuit breaker panel; and
said last portion of said wiring remainder is disposed in an upper compartment of said module exterior frame.

8. The prefabricated electrical module as recited in claim 6, further comprising a colored identifying agent attached to each of said multiple lengths of wiring; wherein said unit circuit panel schedule comprises a color designating a wire length or an installation location; wherein a color of said colored identifying agent corresponds to at least one of said color designating a wire length or an installation location.

9. The prefabricated electrical module as recited in claim 8, wherein said each of said multiple lengths of wiring comprises weatherized UL wiring; wherein said prefabricated electrical module further comprises:
a frame backing forming a back wall of said module exterior frame;
at least one spreader bar attached within said prefabricated electrical module; wherein at least one of said multiple lengths of wiring is attached to said at least one spreader bar; and
a waterproof membrane affixed to at least said casing top surface.

10. The prefabricated electrical module as recited in claim 1, wherein:
said module exterior frame further comprises a frame backing forming a back wall of said module exterior frame;
said prefabricated electrical module further comprises at least two bracing cleats attached near a rear edge of at least two of said four frame walls but offset from said rear edge; and
said frame backing is fixedly attached to said at least two bracing cleats in manner to cause a back surface of the frame backing to be flush with a back surface of said frame top wall, with a back surface of said two opposing frame side walls, and with a back surface of said a frame bottom wall.

11. The prefabricated electrical module as recited in claim 1 further comprising a waterproof membrane disposed upon at least a portion of said enclosure casing.

12. The prefabricated electrical module as recited in claim 11 wherein said waterproof membrane comprises a self-adhering roofing underlayment.

13. The prefabricated electrical module as recited in claim 11 wherein:
- said enclosure casing further comprises a casing back surface; and
- said waterproof membrane is disposed on said casing top surface and said casing back surface.

14. The prefabricated electrical module as recited in claim 11 wherein said each of said multiple lengths of wiring comprises weatherized UL wiring.

15. A main service electrical modular assembly, comprising:
- a module exterior frame comprising four frame walls including a frame top wall, two opposing frame side walls, and a frame bottom wall;
- a unit circuit panel schedule for a specific unit to be constructed removably attached within said module exterior frame and displaying electrical information for said specific unit;
- an enclosure casing mounted within said module exterior frame and accommodating a circuit breaker panel comprising multiple circuit breakers; said enclosure casing comprising a casing top surface and a casing bottom wall configured with at least one bottom exit hole defined by exit hole edges;
- multiple lengths of wiring, with each of said multiple lengths of wiring comprising a wiring proximal end and a wiring remainder; wherein said wiring proximal end is attached within said enclosure casing to one of said multiple circuit breakers; wherein a first portion of said wiring remainder is disposed through said at least one bottom exit hole; wherein said a last portion of wiring remainder is coiled and secured within said module exterior frame; and
- a colored identifying agent attached to each of said multiple lengths of wiring; wherein said unit circuit panel schedule comprises a color designating a wire length or an installation location; wherein a color of said colored identifying agent corresponds to at least one of said color designating a wire length or an installation location.

16. The main service electrical modular assembly as recited in claim 15, further comprising a waterproof membrane affixed to at least said casing top surface.

17. The prefabricated electrical module as recited in claim 16 wherein said waterproof membrane comprises a self-adhering roofing underlayment.

18. The main service electrical modular assembly as recited in claim 15, wherein said frame top wall, said two opposing frame side walls, and said frame bottom wall each comprise a wall outer layer comprising wood and a wall inner layer disposed adjacent to can interior of said wall outer layer; said wall inner layer comprising fiberglass mat gypsum sheathing.

19. A main service electrical modular assembly, comprising:
- a module exterior frame comprising four frame walls including a frame top wall, two opposing frame side walls, and a frame bottom wall;
- an enclosure casing mounted within said module exterior frame and accommodating low-voltage data/video/phone assembly; said enclosure casing comprising a casing top surface and a casing bottom wall configured with at least one bottom exit hole defined by exit hole edges; and
- multiple lengths of low-voltage wiring, with each of said multiple lengths of low-voltage wiring comprising a wiring proximal end and a wiring remainder; wherein said wiring proximal end is attached within said enclosure casing; wherein said a last portion of wiring remainder is coiled and secured within said module exterior frame.

20. The main service electrical modular assembly as recited in claim 19, further comprising a waterproof membrane affixed to at least said casing top surface.

* * * * *